US012316873B2

(12) United States Patent
Chen et al.

(10) Patent No.: US 12,316,873 B2
(45) Date of Patent: *May 27, 2025

(54) VIDEO CODING USING MAPPED TRANSFORMS AND SCANNING MODES

(71) Applicant: QUALCOMM Incorporated, San Diego, CA (US)

(72) Inventors: Peisong Chen, San Diego, CA (US); Yunfei Zheng, San Jose, CA (US); Rajan Laxman Joshi, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,152

(22) Filed: Oct. 27, 2023

(65) Prior Publication Data

US 2024/0129531 A1 Apr. 18, 2024

Related U.S. Application Data

(63) Continuation of application No. 17/810,725, filed on Jul. 5, 2022, now Pat. No. 11,838,548, which is a
(Continued)

(51) Int. Cl.
*H04N 19/60* (2014.01)
*H04N 19/122* (2014.01)
(Continued)

(52) U.S. Cl.
CPC ........... *H04N 19/60* (2014.11); *H04N 19/122* (2014.11); *H04N 19/129* (2014.11);
(Continued)

(58) Field of Classification Search
CPC .. H04N 19/122; H04N 19/129; H04N 19/159; H04N 19/176
See application file for complete search history.

(56) References Cited

U.S. PATENT DOCUMENTS 5,394,473 A 2/1995 Davidson
5,768,434 A 6/1998 Ran
(Continued)

FOREIGN PATENT DOCUMENTS

CN 1735213 A 2/2006
CN 100466745 C 3/2009
(Continued)

OTHER PUBLICATIONS

Amonou (FT) I et al: "Description of Video coding technology proposal by France Telecom, NTT, NTT DoComo, Panasonic and Technicolor", JCTVC-A114, 1.JCT-VC Meeting: Apr. 15, 2010-Apr. 23, 2010; Dresen; (JointCollaborative Team on Video Coding of ISO/IEC JTC1/SC29/WG11 and ITU-TSG.16); URL: http://wftp3.itu.int/av-arch/jctvc-site/,, No. XP030007552, May 7, 2010 (May 7, 2010), XP030007553, ISSN: 0000-0049 p. 54-p. 61 p. 81-p. 85, 248 pages.
(Continued)

*Primary Examiner* — Jeremiah C Hallenbeck-Huber
(74) *Attorney, Agent, or Firm* — Shumaker & Sieffert, P. A.

(57) ABSTRACT

A video encoder may transform residual data by using a transform selected from a group of transforms. The transform is applied to the residual data to create a two-dimensional array of transform coefficients. A scanning mode is selected to scan the transform coefficients in the two-dimensional array into a one-dimensional array of transform coefficients. The combination of transform and scanning mode may be selected from a subset of combinations that is based on an intra-prediction mode. The scanning mode may
(Continued)

also be selected based on the transform used to create the two-dimensional array. The transforms and/or scanning modes used may be signaled to a video decoder.

22 Claims, 15 Drawing Sheets

Related U.S. Application Data continuation of application No. 17/072,381, filed on Oct. 16, 2020, now Pat. No. 11,601,678, which is a continuation of application No. 13/336,682, filed on Dec. 23, 2011, now Pat. No. 10,992,958.

(60) Provisional application No. 61/428,111, filed on Dec. 29, 2010.

(51) Int. Cl.
    *H04N 19/129* (2014.01)
    *H04N 19/147* (2014.01)
    *H04N 19/159* (2014.01)
    *H04N 19/176* (2014.01)
    *H04N 19/46* (2014.01)

(52) U.S. Cl.
    CPC ......... *H04N 19/147* (2014.11); *H04N 19/159* (2014.11); *H04N 19/176* (2014.11); *H04N 19/46* (2014.11)

(56) References Cited

U.S. PATENT DOCUMENTS

| | | | |
|---|---|---|---|
| 5,999,655 A | 12/1999 | Kalker et al. | |
| 6,226,327 B1* | 5/2001 | Igarashi | H04N 19/61 375/E7.25 |
| 6,295,351 B1 | 9/2001 | Malik et al. | |
| 6,324,216 B1 | 11/2001 | Igarashi et al. | |
| 6,608,865 B1 | 8/2003 | Itoh | |
| 6,674,910 B1 | 1/2004 | Moon et al. | |
| 6,795,584 B2 | 9/2004 | Karczewicz et al. | |
| 6,917,711 B1 | 7/2005 | Wang et al. | |
| 7,190,840 B2 | 3/2007 | Said | |
| 7,215,707 B2 | 5/2007 | Lee et al. | |
| 7,233,623 B1 | 6/2007 | Pau et al. | |
| 7,266,149 B2 | 9/2007 | Holcomb et al. | |
| 7,289,674 B2 | 10/2007 | Karczewicz | |
| 7,379,608 B2 | 5/2008 | Marpe et al. | |
| 7,565,020 B2 | 7/2009 | Wu et al. | |
| 7,616,690 B2 | 11/2009 | Vleeschouwer et al. | |
| 7,702,013 B2 | 4/2010 | Schwarz et al. | |
| 7,751,478 B2 | 7/2010 | Kim et al. | |
| 7,782,954 B2 | 8/2010 | Liang et al. | |
| 7,894,530 B2 | 2/2011 | Gordon et al. | |
| 8,179,974 B2 | 5/2012 | Tu et al. | |
| 8,199,819 B2 | 6/2012 | Seo et al. | |
| 8,295,351 B2 | 10/2012 | Palfner et al. | |
| 8,406,299 B2 | 3/2013 | Karczewicz | |
| 8,428,133 B2 | 4/2013 | Ye et al. | |
| 8,447,123 B2 | 5/2013 | Chen et al. | |
| 8,520,960 B2 | 8/2013 | Francois et al. | |
| 8,532,185 B2 | 9/2013 | Jung et al. | |
| 8,548,060 B2 | 10/2013 | Jeong et al. | |
| 8,705,619 B2 | 4/2014 | Nguyen et al. | |
| 8,885,714 B2 | 11/2014 | Budagavi et al. | |
| 8,902,988 B2 | 12/2014 | Sole Rojals et al. | |
| 8,929,440 B2 | 1/2015 | Nguyen et al. | |
| 8,982,961 B2 | 3/2015 | Min et al. | |
| 9,049,443 B2 | 6/2015 | Sole et al. | |
| 9,083,974 B2 | 7/2015 | Jeon et al. | |
| 9,100,648 B2 | 8/2015 | Kim et al. | |
| 9,137,538 B2 | 9/2015 | Palfner et al. | |
| 9,154,801 B2 | 10/2015 | Sze et al. | |
| 9,172,968 B2 | 10/2015 | Karczewicz et al. | |
| 9,215,470 B2 | 12/2015 | Karczewicz et al. | |
| 9,300,970 B2 | 3/2016 | Lee et al. | |
| 9,414,063 B2 | 8/2016 | Lee et al. | |
| 9,661,338 B2 | 5/2017 | Karczewicz et al. | |
| 9,736,500 B2 | 8/2017 | Sole et al. | |
| 9,918,106 B2 | 3/2018 | Kim et al. | |
| 10,992,958 B2 | 4/2021 | Chen et al. | |
| 11,601,678 B2 | 3/2023 | Chen et al. | |
| 11,838,548 B2 | 12/2023 | Chen et al. | |
| 2003/0081850 A1 | 5/2003 | Karczewicz et al. | |
| 2003/0138150 A1 | 7/2003 | Srinivasan | |
| 2003/0231795 A1 | 12/2003 | Karczewicz | |
| 2004/0125204 A1* | 7/2004 | Yamada | H04N 19/124 375/E7.181 |
| 2005/0036549 A1 | 2/2005 | He et al. | |
| 2005/0063462 A1 | 3/2005 | Lee | |
| 2005/0063463 A1 | 3/2005 | Zhang et al. | |
| 2005/0078754 A1 | 4/2005 | Liang et al. | |
| 2005/0084013 A1 | 4/2005 | Wang et al. | |
| 2005/0117789 A1 | 6/2005 | Kim et al. | |
| 2005/0271288 A1 | 12/2005 | Suzuki et al. | |
| 2006/0104527 A1 | 5/2006 | Koto et al. | |
| 2006/0120456 A1 | 6/2006 | Tasaka et al. | |
| 2007/0025631 A1 | 2/2007 | Kim et al. | |
| 2007/0036215 A1 | 2/2007 | Pan et al. | |
| 2007/0098070 A1 | 5/2007 | Saigo et al. | |
| 2007/0171978 A1 | 7/2007 | Chono | |
| 2007/0206872 A1 | 9/2007 | Song | |
| 2008/0025623 A1 | 1/2008 | Jeon et al. | |
| 2008/0152005 A1 | 6/2008 | Oguz et al. | |
| 2008/0159389 A1 | 7/2008 | Lee et al. | |
| 2008/0232463 A1 | 9/2008 | Lu et al. | |
| 2008/0260027 A1 | 10/2008 | Karczewicz | |
| 2008/0285644 A1* | 11/2008 | Seo | H04N 19/159 375/E7.176 |
| 2008/0310504 A1 | 12/2008 | Ye et al. | |
| 2008/0310512 A1 | 12/2008 | Ye et al. | |
| 2008/0310745 A1 | 12/2008 | Ye et al. | |
| 2009/0003440 A1 | 1/2009 | Karczewicz et al. | |
| 2009/0052534 A1 | 2/2009 | Wang et al. | |
| 2009/0060362 A1 | 3/2009 | Harmanci et al. | |
| 2009/0122864 A1* | 5/2009 | Palfner | H04N 19/174 375/E7.243 |
| 2009/0123066 A1* | 5/2009 | Moriya | H04N 19/174 382/166 |
| 2009/0175334 A1* | 7/2009 | Ye | H04N 19/176 375/E7.244 |
| 2009/0196350 A1 | 8/2009 | Xiong | |
| 2009/0226103 A1 | 9/2009 | Choi et al. | |
| 2009/0232211 A1 | 9/2009 | Chen et al. | |
| 2009/0304292 A1 | 12/2009 | Chen et al. | |
| 2010/0020867 A1 | 1/2010 | Wiegand et al. | |
| 2010/0054334 A1 | 3/2010 | Yoo et al. | |
| 2010/0054615 A1 | 3/2010 | Choi et al. | |
| 2010/0124284 A1 | 5/2010 | Lee et al. | |
| 2010/0128995 A1 | 5/2010 | Drugeon et al. | |
| 2010/0172409 A1 | 7/2010 | Reznik et al. | |
| 2010/0208802 A1 | 8/2010 | Tsukuba et al. | |
| 2011/0116539 A1 | 5/2011 | He et al. | |
| 2011/0170592 A1* | 7/2011 | Kim | H04N 19/33 375/240.03 |
| 2011/0206135 A1 | 8/2011 | Drugeon et al. | |
| 2011/0317757 A1 | 12/2011 | Coban et al. | |
| 2012/0082218 A1 | 4/2012 | Misra et al. | |
| 2012/0201300 A1* | 8/2012 | Kim | H04N 19/117 375/240.18 |
| 2012/0243606 A1 | 9/2012 | Lainema et al. | |
| 2013/0177079 A1 | 7/2013 | Kim et al. | |

FOREIGN PATENT DOCUMENTS

| | | |
|---|---|---|
| EP | 1370087 A1 | 12/2003 |
| EP | 1679903 A2 | 7/2006 |
| EP | 2081386 A1 | 7/2009 |
| JP | 2005176073 A | 6/2005 |
| JP | 2007189276 A | 7/2007 |
| JP | 2007267123 A | 10/2007 |
| JP | 2008154155 A | 7/2008 |

(56) References Cited

FOREIGN PATENT DOCUMENTS

| | | | |
|---|---|---|---|
| JP | 2008193627 A | 8/2008 | |
| JP | 2009005413 A | 1/2009 | |
| JP | 2009513056 A | 3/2009 | |
| JP | 2009118233 A | 5/2009 | |
| JP | 2011223068 A | 11/2011 | |
| KR | 1019980034151 A | 8/1998 | |
| KR | 100949475 B1 | 3/2010 | |
| WO | WO-2008044658 A1 | 4/2008 | |
| WO | WO-2008131042 A1 | 10/2008 | |
| WO | WO-2008131045 A2 | 10/2008 | |
| WO | WO-2008157269 A2 | 12/2008 | |
| WO | WO-2008157360 A2 | 12/2008 | |
| WO | WO-2008157431 A2 | 12/2008 | |
| WO | WO-2008157360 A3 | 3/2009 | |
| WO | WO-2009080133 A1 | 7/2009 | |
| WO | WO-2009125907 A1 | 10/2009 | |
| WO | WO-2011031332 A1 | 3/2011 | |
| WO | WO-2011163517 | 12/2011 | |
| WO | WO-2012006568 A1 | 1/2012 | |
| WO | WO-2012006574 A2 | 1/2012 | |

OTHER PUBLICATIONS

Auyeung C., et al., "Intra Coding with Directional DCT and Directional DWT," JCTVC-B107, 2. JCT-VC Meeting; Jul. 21, 2010-Jul. 28, 2010; Geneva; (Joint CollaborativeTeam on Video Coding of 180/IEC JTC1/SC29/ WG11 and ITU-T SG.16 ); URL: http://wftp3.1tu.int/av-arch/ jctvc-site/, No. JCTVC-B107, Jul. 20, 2010, pp. 1-28, XP030007686.

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, Document: JCTVC-L1003_v34, 12th Meeting, Geneva, CH, Jan. 14-23, 2013, entire document, 310 pages.

Bross B., et al., "High Efficiency Video Coding (HEVC) Text Specification Draft 6", JCTVC-H1003 version 22, Joint Collaborative Team on Video Coding (JCT-VC) of ITU-T SG16 WP3 and ISO/IEC JTC1/SC29/WG11, 8th Meeting, San Jose, CA, USA, 99. MPEG Meeting, Feb. 1-10, 2012, 34, 54-55, 74-75, 90-98, 220-224, URL: http://wftp3.itu.int/AV-ARCH/JCTVC-Site/, XP030111769, 259 Pages, Apr. 2, 2012.

Bross B., et al., "High Efficiency Video Coding (HEVC) Text Specification Draft 7," JCTVC-I1003 d2, 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: http://wftp3.1tu.int/av-arch/jctvc-site/ , No. JCTVC-I1003, May 10, 2012 (May 10, 2012), XP030112373, 290 pages.

Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, XP030112947, Jul. 28, 2012 (Jul. 28, 2012), pp. 197-201, section A.4.1 ,A.4.2, 260 Pages.

Bross B., et al., "WD4: Working Draft 4 of High-Efficiency Video Coding," JCTVC-F803_d2, (JCT-VC) of ITU-T SG16 WP3 and ISO/IEC JTC1/SC29/WG11) Joint Collaborative Team on Video Coding, 6th Meeting, Torino, IT, Jul. 14-22, 2011, No. m21449. Nov. 20, 2011 (Nov. 20, 2011), XP030050012, [retrieved on Jul. 14, 2011], abstract, tables 7-14, Sections 7.1. 7.2. 9.3, 226 pages.

Bross B., et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.

Business Communication: "Business Communication", Kabushiki Kaisha Business Communication Sha, vol. 44, No. 6, Jun. 1, 2007, p. 11, ISSN: 0385-695X, p. 92.

Choi B-D., et al., "Adaptive Coefficient Scanning Based on the Intra Prediction Mode", ETRI Journal, vol. 29, No. 5, Oct. 2007, pp. 694-696, p. ISSN: 1225-6463, e-ISSN: 2233-7326, [online].

Chujoh, T., et al., "Description of Video Coding Technology Proposal by Toshiba", Joint Collaborative Team on Video Coding (JCT-VC) of ITU-T SG16 WP3 and ISO/IEC JTC1/SC29/WG11, Document: JCTVC-A117, Status: Input Document to JCT-VC, Apr. 2010, pp. 1-36, Internet<url: http:></url: http:>.

Davies T., et al., "Suggestion for a Test Model", BBC, JCTVC-A033, 1st Meeting, Apr. 15, 2010-Apr. 23, 2010, (Joint Collaborative Team on Video Coding of ISO/IEC JTC1/SC29/WG11 and ITU-TSG 16), Dresden, DE, XP030007526, May 7, 2010 (May 7, 2010), pp. 1-30.

Dong et al., "Introduction to Test Model under Consideration (TmuC)" (Jun. 27, 2010).

European Search Report—EP20157148—Search Authority—Munich—Jul. 6, 2020.

Fan X., et al., "A Novel Coefficient Scanning Scheme for Directional Spatial Prediction-Based Image Compression", Proceedings of International Conference on Multimedia and Expo, 2003, Jul. 6-9, 2003, Piscataway, NJ, vol. 2, pp. 557-560, XP010650616.

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

Huang Y-W., et al., "A Technical Description of MediaTek's Proposal to the JCT-VC CfP", Joint Collaborative Team on Video Coding (JCT-VC) of ITU-T SG16 WP3 and ISO/IEC JTC1/SC29/WG11; 1st Meeting: Dresden, DE, JCTVC-A109_r2, JCT-VC input document JCT-VC-A109_r2, Apr. 15-23, 2010, Apr. 17, 2010, XP002664256, pp. 1-41.

International Search Report and Written Opinion—PCT/US2011/067398—ISA/EPO—Mar. 22, 2012.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

ITU-T H.265, Series H: Audiovisual and Multimedia Systems, Infrastructure of Audiovisual Services—Coding of Moving Video, Advanced Video Coding for Generic Audiovisual Services, The International Telecommunication Union, Oct. 2014, 540 pp.

ITU-T H.265, Series H: Audiovisual and Multimedia Systems, Infrastructure of Audiovisual Services—Coding of Moving Video, High Efficiency Video Coding, The International Telecommunication Union, Apr. 30, 2013, 317 Pages, (pp. 227-228,231, 237-241, 250-251, 276-278), Retrieved from the Internet: https://www.itu.int/rec/dologin_pub.asp?lang=e&id=H.265-201304-S !!PDF-E&type=items.

JCT-VC: "Test Model Under Consideration", Joint Collaborative Team on Video Coding (JCT-VC) of ITU-T SG16 WP3 and ISO/IEC JTC1/SC29/WG11, Document: JCTVC-B205, Status: Output Document (draft000), 2nd Meeting, Geneva, CH, Jul. 21, 2010-Jul. 28, 2010, Jul. 2010, XP030007704, pp. 1-152 (1-4, 18-21, 42-47, 142), Jul. 28, 2010, Internet: URL: http://phenix.int-evry.fr/jct/doc_end_user/documents/20_Geneva/wg11/JCTVC-B205.zip.

JCT-VC, "Test Model under Consideration (Output Document draft000)," Document: JCTVC-B205, 2nd Meeting: Geneva, CH, Jul. 21-28, 2010.

Jin X., et al., "Spatially Scalable Video Coding with In-band Prediction," Visual Communications and Image Processing, 2005, vol. 5960, pp. 221-229.

Joshi, R., et al., "CE7: Mode Dependent Intra Residual Coding," 5th Meeting, Mar. 16-23, 2011, Document: JCTVC-E098, 9 pp.

Karczewicz M., et al., "CE5: Improved coefficient coding with LCEC," Document: JCTVC-D374, 4th Meeting: Daegu, KR, Jan. 20-28, 2011, 3 pages.

(56) References Cited

OTHER PUBLICATIONS

Karczewicz (Qualcomm) M., et al., "Video Coding Technology Proposal by Qualcomm Inc", 1. JCT-VC Meeting; JCTVC-A121, Apr. 15, 2010-Apr. 23, 2010; Dresden; (Joint Collaborative Team on Video Coding of ISO/IEC JTC1/SC29/WG11 and ITU-TSG.16), No. XP030007566, (May 18, 2010), pp. 1-24, XP030007567.

Kim C., et al., "Feature-Based Intra-Prediction Mode Decision for H.264," Image Processing, 2004. ICIP 04. 2004 International Conference on Singapore Oct. 24-27, 2004, Piscataway, NJ, USA.IEEE, vol. 2, Oct. 24, 2004 (Oct. 24, 2004), XP010785116, pp. 769-772.

Kim D-Y., et al., "Enhanced Intra Coding", ITU—Telecommunications Standardization Sector Study Group 16 Question 6, Document: VCEG-AH11, [online], Jan. 9, 2008, URL: http://wftp3.itu.int/av-arch/video-site/0801_Ant/VCEG-AH11.zip.

Korean Patent Abstracts, Jeong, Je-Chang and Kim, Dong-Hyung, "Apparatus and method for fast mode selection", XP002660082 abstract & KR100865690 B1 (IUCF HYU [KR]) Oct. 28, 2008 (Oct. 28, 2008).

Lee et al., "Adaptive Scanning for H.264/AVC Intra Coding," ETRI Journal, vol. 28, No. 5, pp. 668-671, Oct. 2006.

Lee S., et.al., "High-Efficiency Video Compression Framework Based on Flexible Unit Representation," Proceedings of the Second APSIPA Annual Summit and Conference, Dec. 17, 2010, pp. 623-631, [online], URL : http://www.apsipa.org/proceedings_2010/pdf/APSIPA124.pdf.

Li et al.,"Prediction Based Adaptive Transform Coefficients Scanning for Inter-Frame Video Coding," pp. 4205-4208 (2010).

Li X., et al., "Predictive Adaptive Transform Coefficients Scan Ordering for Inter-Frame Coding", Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A020 (r1), 4 Pages.

Marpe D., et al., "Context-Based Adaptive Binary Arithmetic Coding in the H.264/AVC Video Compression Standard", IEEE Transaction on Circuits and Systems for Video Technology, IEEE Service Center, Piscataway, NJ, US, vol. 13, No. 7, Jul. 1, 2003 (Jul. 1, 2003), XP011099255, XP002509017, pp. 620-636, section III, C.2, p. 632, ISSN: 1051-8215, DOI:10.1109/TCSVT.2003.815173, the whole document.

McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Mrak, M. et al., "A context modeling algorithm and its application in video compression", Proceedings International Conference on Image Processing (ICIP), Sep. 14, 2003, pp. 845-848, vol. 3, IEEE, XP010669966, ISBN: 978-0-7803-7750-9.

Pan et al., Fast Mode Decision Algorithm for Intraprediction in H.264/AVC Video Coding pp. 813-822 (2005).

Said A., "Introduction to Arithmetic Coding—Theory and Practice", Technical Report, Apr. 21, 2004, pp. 1-67, Retrieved from the Internet: URL: http://www.hpl.hp.com/techreports/2004/HPL-2004-76.pdf.

Saito S., et al., "HD-SDI H.264 Very low delay encoder/decoder device 'EHH-1000E/D' and its application," Image Information Industrial, Feb. 2009, Issue vol. 41, No. 2, Sangyo Kaihatsukiko Inc., Feb. 1, 2009, pp. 15-20.

Saxena et al., "Jointly optimal intra prediction and adaptive primary transform", 3. JCT-VC Meeting; 94. Mpeg Meeting; Jul. 10, 2010-Oct. 15, 2010; Guangzhou; (Joint Collaborative Team on Video Coding of ISO /IECJTC1/SC29/WG11 and ITU-T 56.16); URL: http://wftp3.itu.int/av-arch/jctvc-site/, No. JCTVC-C108, Oct. 2, 2010 (2010-18-82), 21 Pages, XP030007815, ISSN: 0000-0045.

Second Written Opinion of International Application No. PCT/US2011/067398, dated Dec. 2, 2012, 7 pages.

Seregin V., et al., "Low-complexity adaptive coefficients scanning", 94. MPEG Meeting; Oct. 11, 2010-Oct. 15, 2010; Guangzhou; (Motion Picture Expert Group or ISO/IEC JTC1/SC29/WG11), JCTVC-C205, No. M18243, Oct. 28, 2010 (Oct. 28, 2010), XP030046833, pp. 1-4.

Sezer et al., "Robust Learning of 2-D Separable Transforms for Next-Generation Video Coding," Mitsubishi Electric Research Laboratories, Inc., Cambridge, MA, Mar. 2011, 12 PP.

Sohn Y., et al., "One Dimensional Transform for H.264 Based Intra Coding (Abstract)", 26. Picture Coding Symposium; Jul. 11, 2007-Sep. 11, 2007; Lisbon, 4 Pages, XP030080458, Nov. 7, 2007 (Nov. 7, 2007).

Suzuki, et al., "Description of Video Coding Technology Proposal by Sony," Joint Collaborative Team on Video Coding (JCT-VC) of ITU-T SG16 WP3 and ISO/IEC JTC1/SC29/WG11, Document JCTVC-A103, 1st Meeting: Dresden, DE, Apr. 15-23, 2010, 51 pp.

Suzuki Y., "Recent Trend of MPEG-4 Visual," Technical Report of the Information Processing Society of Japan (IPSJ), vol. 2004, No. 25 (2004-AVM-44), IPSJ, Mar. 5, 2004, pp. 85-90, ISSN: 0919-6072.

Wang, et al., "A fast transform domain based algorithm for H.264/AVC intra prediction", 2007 IEEE International Conference on Multimedia and Expo, Beijing, CN, Jul. 2-5, 2007, pp. 1563-1566.

Wei Z., et al., "An Efficient Intra Mode Selection Algorithm for H.264 Based on Fast Edge Classification," IEEE International Symposium on Circuits and Systems (ISCAS), 2007, pp. 3630-3633.

Wiegand T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 Pages.

Wiegand T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 Pages.

Wiegand T., et al., "WD3: Working Draft 3 of High-Efficiency Video Coding", JCTVC-E603_d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 239 Pages, Paragraph [8.6.1], Tables 8-13, ISSN:0000-0003.

Wien M., "Variable Block-Size Transforms for H.264/AVC," IEEE Transactions on Circuits and Systems for Video Technology, vol. 13, No. 7, Jul. 2003, pp. 604-613, XP011099253, ISSN: 1051-8215, DOI: 10.1109/TCSVT.2003.815380.

Witten I.A., et al., "Arithmetic Coding for Data Compression", Communications of the ACM, vol. 30, No. 6, Jun. 1987, pp. 520-540.

Xu J., et al., "An Overview of Directional Transforms in Image Coding", Circuits and Systems (ISCAS), Proceedings of 2010 IEEE International Symposium on, May 30, 2010-Jun. 2, 2010, pp. 3036-3039.

Yang H., et al., "Simplified MDDT (SMDDT) for Intra Prediction Residual", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B039, 7 Pages.

Yang H., et al., "Symmetry-based Scan Order Sharing Scheme for MDDT", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, WG11 No. m18129, JCTVC-C106, 4 Pages.

Ye Y., et al., "Improved H.264 Intra Coding Based on Bi-Directional Intra Prediction, Directional Transform, and Adaptive Coefficient Scanning", 15th IEEE International Conference on Image Processing, 2008, ICIP 2008, Oct. 12, 2008, pp. 2116-2119, XP031374452.

Ye Y., et al., "Improved Intra Coding", 33. VCEG Meeting; 82. Mpeg Meeting; Oct. 20, 2007-Oct. 20, 2007; Shenzhen; ITU—Telecommunications Standardization Sector; Study Group 16 Question 6, (Video Coding Experts Group of ITU-T SG.16), No. VCEG-AG11, Oct. 20, 2007, 6 Pages, XP030003615, ISSN: 0000-0095.

Yeo C., et al., "Mode-Dependent Coefficient Scanning for Intra Prediction Residual Coding", Joint Collaborative Team on Video

(56) References Cited

OTHER PUBLICATIONS

Coding (JCT-VC) of ITU-T SG16 WP3 and ISO/IEC JTC1/SC29/WG11, 4th Meeting: Daegu, KR, Jan. 20-28, 2011, JCTVC-D049, m18796, XP030008090, pp. 1-7.

Yeo C., et.al., "Choice of Transforms in MDDT for Unified Intra Prediction," [online], Joint Collaborative Team on Video Coding (JCT-VC) of ITU-T SG16 WP3 and ISO/IEC JTC1/SC29/WG11, Oct. 2, 2010, Document: JCTVC-C039 (version 1), URL : http://phenix.it-sudparis.eu/jct/doc_end_user/documents/3_Guangzhou/wg11/JCTVC-C039-m18060-v1-JCTVC-C039.zip, pp. 1-4.

Yeo C., et.al., "Mode-Dependent Fast Separable KLT for Block-based Intra Coding," [online] Joint Collaborative Team on Video Coding (JCT-VC) of ITU-T SG16 WP3 and ISO/IEC JTC1/SC29/WG11, Jul. 28, 2010, Document: JCTVC-B024, URL : http://phenix.it-sudparis.eu/jct/doc_end_user/documents/2_Geneva/wg11/JCTVC-B024.zip.

Yeo et al., "TE7: Results for Mode-Dependent Fast Separable KLT for Block-based Intra Coding," Joint Collaborative Team on Video Coding (JCT-VC), of ITU-T SG16 WP3 and ISO/IEC JTC1/SC29/WG11 , 3rd Meeting: Guangzhou, CN, Oct. 7-15, 2010, Document: JCTVC-C037, 4 pp.

Zhang K et al., "Enhanced Intra Prediction and Transform for Video Coding", 2010 17th IEEE International Conference on Image Processing (ICIP 2010), Hong Kong, Sep. 26-29, 2010, IEEE, Sep. 26, 2010 (Sep. 26, 2010), pp. 3381-3384, XP031814166, ISBN: 978-1-4244-7992-4, Section 3.3.

Zhao X., et al., "Rate-Distortion Optimized Transform", 90th Mpeg Meeting; Oct. 26, 2009-Oct. 30, 2009; Xian; (Motion Picture Expert Group or ISO/IEC JTC1/SC29/WG11),, No. M16926, Nov. 2, 2009, XP030045516, 8 Pages.

Zhao X., et al., "Rate-Distortion Optimized Transform for Intra-Frame Coding", IEEE International Conference on Acoustics, Speech and Signal Processing (ICASSP), Piscataway, NJ, USA, Mar. 14, 2010, XP031743031, pp. 1414-1417.

Zheng Y., et al., "CE11: Mode Dependent Coefficient Scanning", 4. JCT-VC Meeting; 95. Mpeg Meeting; Jan. 20, 2011-Jan. 28, 2011; Daegu; (Joint Collaborative Team on Video Coding of ISO/IEC JTC1/SC29/WG11AND ITU-T SG.16); No. JCTVC-D393, Jan. 16, 2011, pp. 1-5, XP030008432, ISSN: 0000-0013, URL: http://wftp3.itu.int/av-arch/jctvc-site.

\* cited by examiner

VIDEO CODING USING MAPPED TRANSFORMS AND SCANNING MODES

CROSS-REFERENCE TO RELATED APPLICATIONS

This application is a continuation of U.S. application Ser. No. 17/810,725, filed Jul. 5, 2022, which is a continuation of U.S. application Ser. No. 17/072,381, filed Oct. 16, 2020, issued as U.S. Pat. No. 11,601,678, which is a continuation of U.S. application Ser. No. 13/336,682, filed Dec. 23, 2011, issued as U.S. Pat. No. 10,992,958, which claims the benefit of U.S. Provisional Application No. 61/428,111, filed Dec. 29, 2010, the entire content of each of which are hereby incorporated by reference herein.

TECHNICAL FIELD

This disclosure relates to video coding, and more particularly to techniques for generating and scanning transform coefficients generated by a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for transforming residual video data and scanning transform coefficients during a video coding process. In general, blocks of a picture to be coded may be intra-mode encoded (e.g., encoded relative to other blocks of the same picture) or inter-mode encoded (e.g., encoded relative to blocks of a previously coded picture). In either case, a video encoder forms predictive data and residual data.

In one example of the disclosure, a video encoder may be configured to determine a subset of transform and scanning mode combinations based on the intra-prediction mode, select a transform and a scanning mode combination from the subset of transform and scanning mode combinations, apply the selected transform to residual data associated with predicting a block based on the intra-prediction mode so as to generate a two-dimensional array of transform coefficients, and apply the selected scanning mode to the two-dimensional array of transform coefficients to generate a one-dimensional array of transform coefficients.

The video encoder may be further configured to signal an index which indicates the combination of transform and scanning modes that were selected. In other examples, the index may only indicate the transform. In such cases, a video decoder may infer the scanning mode based on the transform or may infer the scanning mode based on the intra-prediction mode. In this case, the transform may be chosen from all possible transforms or from a subset of transforms, wherein the subset is determined based on the intra prediction mode.

In another example of the disclosure a video decoder may be configured to receive encoded video data, wherein the encoded video data was encoded according to an intra-prediction mode, entropy decode the encoded video data, thereby creating a one-dimensional array of transform coefficients, determine a transform from a subset of transform and scanning mode combinations, wherein the subset is based on the intra-prediction mode, determine a scanning mode from the subset of transform and scanning mode combinations, scan the one-dimensional array of transform coefficients with the determined scanning mode to produce a two-dimensional array of transform coefficients, and inverse transform the two-dimensional array of transform coefficients with the determined transform to produce residual video data associated with predicting a block based on the intra-prediction mode.

In another example of the disclosure, a video encoder may transform the residual data, using a transform from a plurality of transforms, such as discrete sine transforms, discrete cosine transforms, designed transforms and/or a combination of a primary transform, such as 2-D discrete cosine transform with a secondary transform, such as a 2-D rotational transform. The transform may be a 2-D separable transform having components applied in orthogonal directions (e.g., a vertical and a horizontal direction). The secondary transform may be applied to the transform coefficients of a primary transform. The combination of the 2-D primary transform and the 2-D secondary transform may be considered as a single 2-D transform. The video encoder may apply the transform to the residual data to create a two-dimensional array of transform coefficients. The video encoder may be configured to select a scanning mode to scan the transform coefficients in the two-dimensional array into a one-dimensional array of transform coefficients. The scanning mode may be selected based on the transform used to create the two-dimensional array. In one example, transforms may be mapped to scanning modes. The transforms and/or scanning modes used may be signaled to a video decoder. After scanning with the selected scanning mode, the one-dimensional array of transform coefficients may be entropy encoded.

In another example of this disclosure, a video decoder may entropy decode encoded video data to retrieve a one-dimensional array of transform coefficients. The video decoder then performs an inverse scanning process to convert the one-dimensional array of transform coefficients into a two-dimensional array of transform coefficients. The video decoder uses the same scanning mode (in an inverse manner) as was used by the video encoder. This may be determined by the video decoder by retrieving a signaling element indicating the transform used by the video encoder, and then selecting the scanning mode that is mapped to the transform or combination of transforms. After inverse scanning, the video encoder may then apply an inverse transform to the two-dimensional array of transform coefficients to retrieve the residual data.

The details of one or more examples are set forth in the accompanying drawings and the description below. Other features, objects, and advantages will be apparent from the description and drawings, and from the claims.

DETAILED DESCRIPTION

Figure 1:
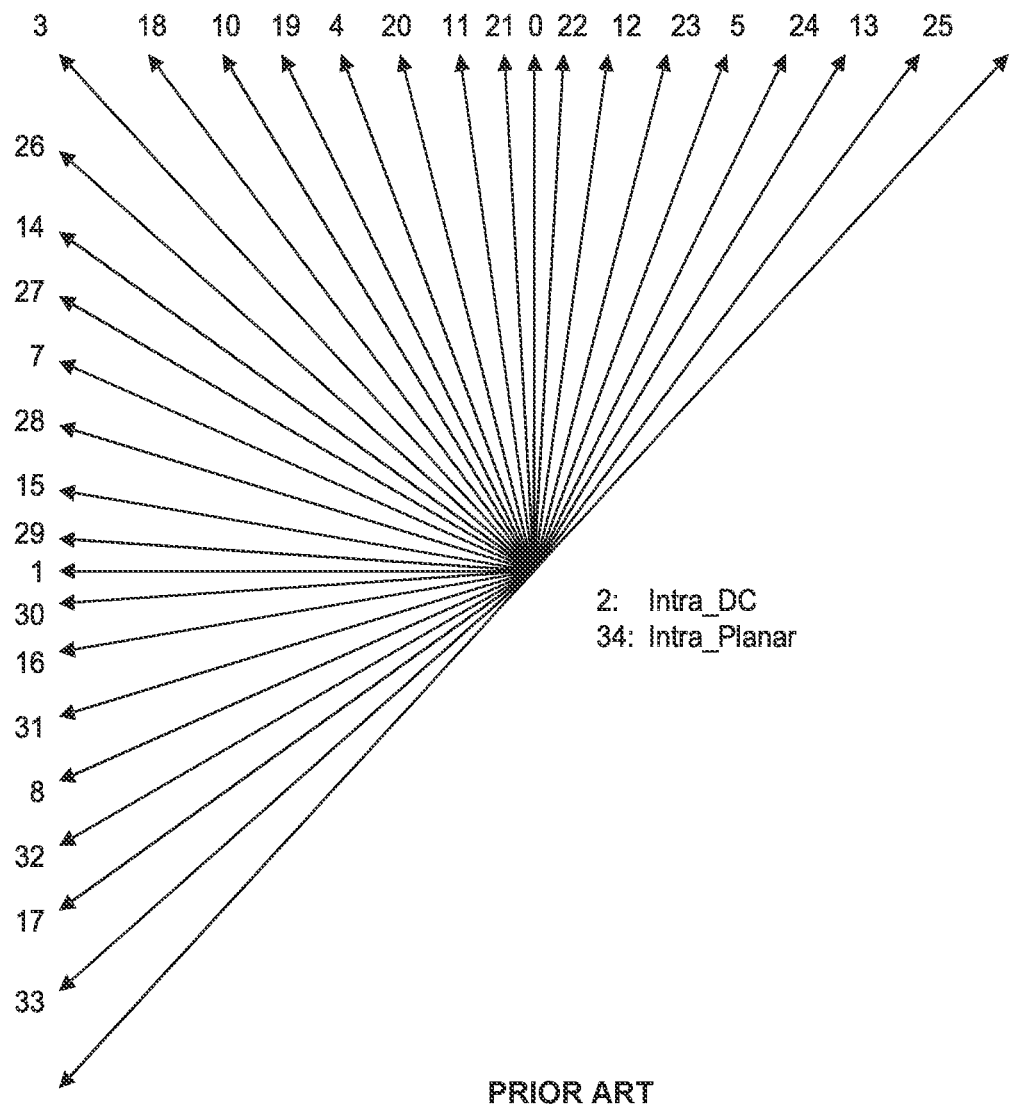
FIG. 1 is a conceptual diagram illustrating example intra-prediction mode directions.

In general, this disclosure describes techniques for coding video data. More specifically, this disclosure describes techniques relating to transforming residual data and scanning transform coefficients during a video coding process. In one example, this disclosure proposes that transforms are mapped to scanning modes.

Digital video devices implement video compression techniques to transmit and receive digital video information more efficiently. Video compression may apply spatial (intra-frame) prediction and/or temporal (inter-frame) prediction techniques to reduce or remove redundancy inherent in video sequences.

For video coding according to the high efficiency video coding (HEVC) standard currently under development by the Joint Cooperative Team for Video Coding (JCT-VC), as one example, a video frame may be partitioned into coding units. A coding unit generally refers to an image region that serves as a basic unit to which various coding tools are applied for video compression. A coding unit is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

To achieve desirable coding efficiency, a coding unit (CU) may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as the H.264 standard. A transform unit (TU) generally refers to a block of residual data to which a transform is applied to produce transform coefficients. This disclosure also uses the term "block" to refer to any of a CU, PU, or TU.

A coding unit usually has a luminance component, denoted as Y, and two chroma components, denoted as U and V. Depending on the video sampling format, the size of the U and V components, in terms of number of samples, may be the same as or different from the size of the Y component.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

The thirty-five intra-prediction modes in HEVC include one DC mode, one planar mode, and 33 different directional prediction modes. With a directional prediction mode, prediction is performed based on neighboring block reconstructed pixels along a certain direction indicated by the mode. The directions associated with different prediction modes are shown in FIG. 1.

Upon identification of a predictive block, the difference between the original video data block and its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), a discrete sine transform (DST), an integer transform, a Karhunen-Loeve transform (KLT), or another transform. The KLT may be designed from residual blocks generated by training set of sequences or may be derived from correlation model for the prediction residual. It may be possible to use other methods to design a transform from residual blocks generated by training a set of sequences. This disclosure also uses the term "design transform" to refer to such a transform.

References to "DCT transforms" or other similar transforms should be understood to include both fixed-point implementations and floating point implementations. As one example, an implementation of a DCT transform may actually comprise an approximation of a DCT, such that the DCT transform has integer coefficients (that is, fixed point coefficients) rather than rational number coefficients.

In some examples, a transform may comprise a non-separable transform. Non-separable transforms are typically computationally expensive, and therefore, video coding devices may instead apply separable transforms. In general, separable transforms include a horizontal component applied to rows of the block and a vertical component applied to columns of the block. In this manner, a separable transform may have a row transform component and a column transform component, also referred to as two orthogonal transform components. Two matrices may be used to define a separable transform, each of the matrices corresponding to one of the orthogonal transform components. A non-separable transform may include only one matrix that, when applied, produces a conceptually similar result to application of the separable transform, but through relatively more intensive calculations.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), or the like, to the quantized transform coefficients.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC).

Figure 2:
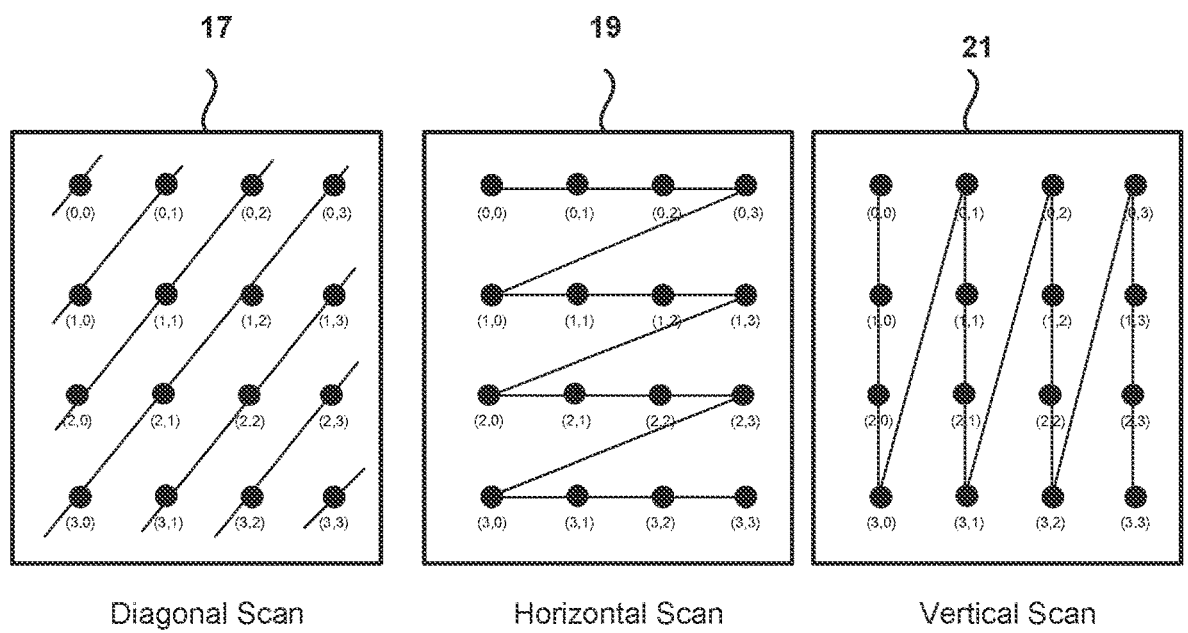
FIG. 2 is a diagram illustrating example scanning modes for scanning transform coefficients.

Typically, transform coefficients that are specified in a two-dimensional array are grouped within that array in a manner than enables run-length coding if properly read from the two-dimensional array. Proper reading implies that non-zero coefficients are grouped together as well as possible and zero-valued coefficients are grouped together as well as possible. The encoder may use a scanning mode to extract the transform coefficients from the two-dimensional array. These scanning modes may perform a diagonal scan, a horizontal scan or a vertical scan, as shown in FIG. 2, or any other type of scan over the two-dimensional array of transform coefficients to produce a one-dimensional array of transform coefficients. For example, adaptive scans may also be performed.

When executing diagonal scanning mode 17, a video coding device traverses the two-dimensional array in a diagonal pattern. FIG. 2 is a conceptual diagram that shows one possible example for a 4×4 block. Likewise, a video coding device using the horizontal scanning mode 19 traverses the two-dimensional array in a horizontal pattern. A video coding device using the vertical scanning mode 21 traverses the two-dimensional array in a vertical pattern. Each of these scanning modes may be performed in the forward or inverse direction. A scanning mode in the forward direction proceeds from the upper left corner of the array (i.e., the DC coefficient of the array) to the lower right corner of the array (i.e., the higher frequency coefficients of the array). Conversely, a scanning mode in the inverse direction proceeds from the lower right corner of the array to the upper left corner of the array.

In one conventional example, a video encoder performs each of the three scanning modes shown in the example of FIG. 2 and evaluates the result of scanning the transform coefficients in accordance with each of these scanning modes. To evaluate these scanning modes, the encoder may determine the extent to which the transform coefficients are grouped together in the one-dimensional array after the scan. The encoder then selects the one of the performed scanning modes that provides the best grouping of transform coefficients within the one-dimensional array and signals that this scanning mode was used to scan the transform coefficients.

In another example, the proposed HEVC standard currently specifies 12 different combinations of transforms and scanning modes for intra-prediction. The current transforms for intra-prediction in HEVC include a horizontal DCT/vertical DST, a horizontal DST/vertical DCT, a horizontal DCT/vertical DCT, and a horizontal DST/vertical DST. The current scanning modes include a horizontal scanning mode, a vertical scanning mode, and a diagonal scanning mode, as is shown in FIG. 2. For each intra-prediction mode, each combination is tested and the transform/scanning mode combination that provides for the best bit rate (or meets a bit rate threshold) is chosen for use. Testing all 12 combinations often causes an increased computational burden on the encoder. Furthermore, the transform and scanning mode combination is signaled in the encoded bitstream. Since there are 12 combinations, a relatively large number of bits are used for signaling the combination, thus increasing the bit rate. The example of 12 combinations in HEVC is just one example. The techniques of this disclosure may be applicable for any video coding scheme with any number of transform and scanning mode combinations, and is applicable with any type of transform and any type of scanning mode. As is described in greater detail below, this disclosure provides techniques to reduce computational complexity and to improve bitstream coding efficiency.

This disclosure describes several techniques related to transformation, quantization, scanning, and entropy encoding of residual values during a video coding process. The techniques may be applied by both video encoding and decoding units, including video encoder/decoders (CODECs) and processing units configured to perform video encoding and/or decoding. References to "video coding units" or "video coding devices" should be understood to refer to units or devices capable of encoding, decoding, or both encoding and decoding video data.

In general, the techniques of this disclosure relate to transforming residual data and scanning transform coefficients of a TU. In one example, the techniques of this disclosure include determining a subset of transform and scanning mode combinations based on an intra-prediction mode used in creating residual data. By reducing the number of combinations to a subset of the total number of combinations, the computational burden of selecting the transform and scanning mode can be reduced. In addition, the transform and scanning mode combination can be signaled in the encoded video bitstream as an index that indicates the combination. If the total number of combinations in the subset for each intra-prediction mode is limited to four or fewer combinations, the index of the combination can be as small as 2-bits. The index may be entropy-coded using context adaptive binary arithmetic coder (CABAC) or context adaptive variable length codes (CAVLC). This may result in a substantial reduction in overhead signaling, thus reducing the bit rate.

The preferred combination of subsets for each intra-prediction mode may be determined by evaluating the rate-distortion cost corresponding to each of the 12 possible transform-scan combinations for each intra-prediction mode on a set of training sequences, and choosing a subset of combinations that provides the best rate-distortion cost over the training set of sequences. As an example, for a horizontal prediction mode, when only two combinations are used, the subset may be chosen to be (1) horizontal DST/vertical DCT and vertical scan and (2) horizontal DCT/vertical DCT and diagonal scan.

In this example, a video encoder calculates residual data according to an intra-prediction mode. A subset of transform and scanning mode combinations are determined based on the intra-prediction mode. A transform and a scanning mode combination is selected from the subset. Selection within the subset may be based on testing each transform and scanning mode combination in the subset and selecting the combination that provides for the lowest rate-distortion cost.

The selected transform is then applied to the residual data so as to generate a two-dimensional array of transform coefficients. The selected scanning mode is applied to the two-dimensional array of transform coefficients to generate a one-dimensional array of transform coefficients. The one-dimensional array of transform coefficients may be entropy coded, thus forming an encoded video bitstream.

The combination of transform and scanning mode that is selected may be signaled in the encoded video bitstream using an index. The index indicates the combination relative to the subset based on the intra-prediction mode. If the subset is limited to four combinations or less, the index may be as small as 2-bits. The index may be entropy coded using CABAC or CAVLC. The video encoder and video decoder may store configuration data indicating the transform and scanning mode combinations for each subset (and thus for each intra-prediction mode) as well as a mapping of the index to the specific combination for the subset.

In another signaling example, the index indicates only the selected transform. The scanning mode is then based on the transform. As such, each transform maps to a specific scanning mode. The mapping between transforms and scanning modes may be stored as configuration data in both a video encoder and a video decoder.

In another signaling example, the index indicates the selected transform. The scanning mode is then based on the intra-prediction mode. As such, the scanning modes for every combination in the subset will be the same, as the subset is also based on the intra-prediction mode. The video encoder and video decoder may store configuration data that indicates the relationship between scanning modes and intra-prediction modes.

As another example, the techniques of this disclosure include selection of a transform to use to transform a residual value of an intra-predicted block or inter-predicted block and selection of a scanning mode based on the selected transform. In one example, transforms are mapped to a scanning mode. The scanning mode may define a predefined scan, such as a horizontal, vertical, diagonal or zig-zag scan, as opposed to an adaptive scan that modifies a scan order over time based on statistics calculated for scanned coefficients. The techniques of this example may be implemented in conjunction with the subset technique described above or may be implemented independently.

In other words, a video coding device may include a set of configuration data that specifies a mapping from a transform to a scan to be applied when that transform is applied. For example, the configuration data specifying the mapping may be stored in a memory. In this manner, a video encoder may simply provide an indication of a transform to be applied, and a video decoder may determine both an inverse transform and an inverse scan to apply to a coded set of data. That is, using a single syntax element, the video decoder may determine an inverse scan to apply to a set of serialized transform coefficients to reproduce a two-dimensional matrix of transform coefficients, as well as an inverse transform to apply to the two-dimensional matrix to reproduce a block of residual data.

In accordance with the techniques described in this disclosure, transforms, including non-separable and separable transforms, may be mapped to certain scanning modes so as to avoid having to perform multiple scan and evaluations as described above. Test results have shown that certain scanning modes are more likely to be selected when certain transforms are used to create the two-dimensional array of transform coefficients. Rather than testing all available scanning modes, the techniques of this disclosure allow for reduced computational complexity in choosing the scanning modes by eliminating the need for such testing. Moreover, these techniques also allow for a reduction in bit usage in the bitstream, as a separate indication of the scan need not be provided. As discussed previously, the mapping from transforms to scans may be generated by encoding a large number training sequences, and for each type of transform, evaluating the rate-distortion cost for each scanning mode to determine which scanning mode may be the best in a rate-distortion sense for a specific transform. For example, if horizontal DCT/vertical DST is applied to a block, then a horizontal scan may be the best. Similarly if horizontal DST/vertical DCT is applied, a vertical scan may be the best.

Figure 3:
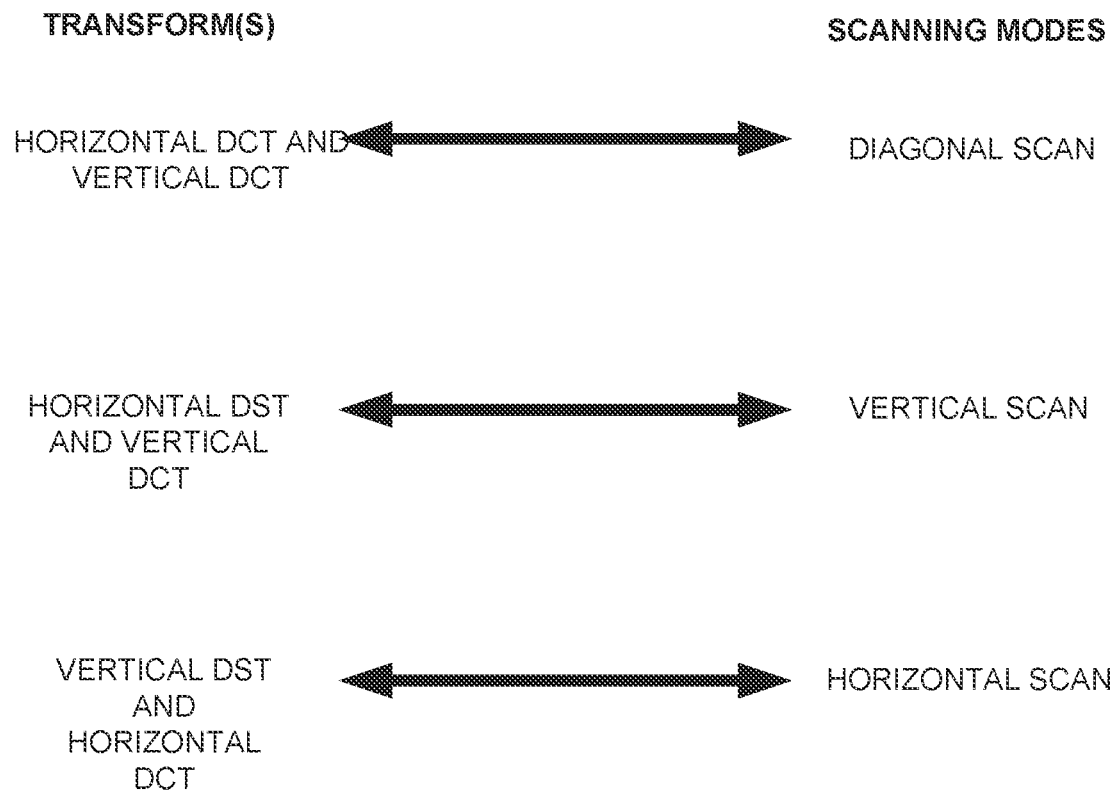
FIG. 3 is a diagram illustrating mappings between transforms and scanning modes.

FIG. 3 is a conceptual diagram that shows example mappings between transforms and scanning modes that have shown to work well in test results. A video coding device may include a set of configuration data representative of these or other mappings from a transform to a scan. As one example, a horizontal DCT/vertical DCT transform may be mapped to a diagonal scanning mode.

As another example, a separable transform including a first designed transform component in the vertical direction and a DCT component in the horizontal direction may be mapped to a horizontal scanning mode. A designed transform refers to a KLT, DCT, DST or any other transform or transform component of a separable transform that is specifically designed to yield some result, where such design is often accomplished through extensive training. That is, the input coefficient values that define a designed transform may be determined based on the correlation, or similar statistics, of a number of prediction residual blocks resulting from intra prediction. Alternatively, such statistics may be used to fit a model to the residual values and the model may be used, in turn, to derive a transform. This may involve multiple iterations of determining the mapping from intra prediction modes to transforms and then designing a transform based on correlation statistics of all the blocks to which the same transform is applied.

As another example, a separable transform including a DCT component in the vertical direction and a second designed transform component in the horizontal direction may be mapped to a vertical scanning mode.

The combinations may also be varied in a number of ways. For example, a separable transform including a DCT component or some other transform component in the vertical direction and the first designed transform component in the horizontal direction may be mapped to the horizontal scanning mode. Likewise, a separable transform including the second designed transform component in the vertical direction and the DCT component or some other transform component in the horizontal direction may be mapped to the vertical scan.

In another example in which these combinations may be varied, a separable transform including a first designed transform component in the horizontal direction and a second designed transform component in the vertical direction may be mapped to the horizontal scanning mode.

Alternatively, a separable transform including a third designed transform component in the horizontal direction and a fourth designed transform component in the vertical direction may be mapped to the vertical scanning mode.

Use of numeric identifiers, such as "first," "second," etc., should be understood in a nominal sense, rather than an ordinal sense. That is, the designation of "first" should be understood to refer to an arbitrary element in a set of similar elements, rather than as the ordinal first element in the set.

Regardless of the combination of transform and scanning mode employed, the encoder may signal the combination in the encoded video bitstream, or alternatively, both the encoder and the decoder may employ the same logic, rules, and/or software to select the combination in a common way. For example, a video decoder may infer the transform used by the encoder from one or more coding characteristics such as block size, coding mode, or the like. In one example, the encoder may simply signal the transform used in the encoded video bitstream, as the scanning mode is mapped from the transform or combination of transforms used. In another example, the video encoder may signal the inverse transform that a video decoder should use to reverse the transform applied by the encoder. The video decoder may then infer the transform used by the encoder from the signaled indication of the inverse transform. By receiving information indicative of the transform used by the encoder, a video decoder may perform a simple lookup to ascertain the appropriate scanning mode.

The techniques of this example allow a video encoder to avoid having to perform all of the scanning modes with respect to each and every two-dimensional array of transform coefficients, and instead, provide for selection of one of the scanning modes based on a mapping from the applied transform. Moreover, these techniques allow the video encoder to simply provide a single value representative of both the transform and the scan to be applied, and thus, may reduce the number of bits in the bitstream vis-à-vis separately signaling both the transform and the scan. Typically, mappings are defined such that the mapped scanning mode represents a scan that is determined to provide the best results for the transform from which the scan is mapped for a large set of sample data. Thus, the scan may be considered the best of the available scanning modes in terms of grouping for generating the one dimensional array of transform coefficients. Consequently, the techniques of this disclosure exploit these associations to provide for efficient encoding of video data.

Figure 4:
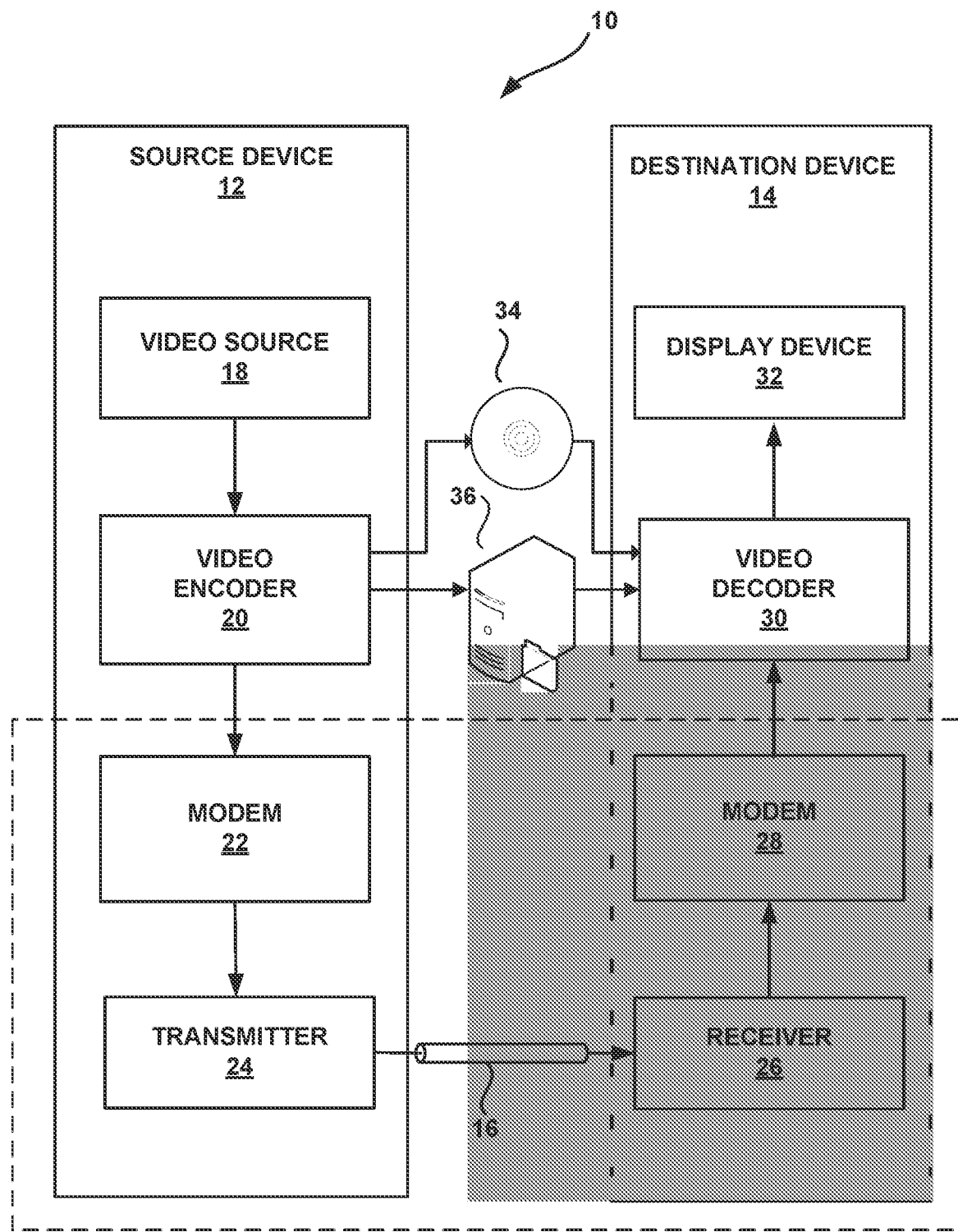
FIG. 4 is a block diagram illustrating an example video encoding and decoding system.

FIG. 4 is a block diagram illustrating an example video encoding and decoding system 10 that may be configured to utilize techniques for transforming residual data and scanning transform coefficients in accordance with examples of this disclosure. As shown in FIG. 4, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD) or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for transforming residual data and scanning transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 4, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 4, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 4, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 4, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for transforming residual data and scanning transform coefficients in a video coding process. Likewise, the video decoder 30 may implement any or all of these techniques for transforming residual data and scanning transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to calculate residual data according to an intra-prediction mode, determine a subset of transform and scanning mode combinations based on the intra-prediction mode, select a transform and a scanning mode combination from the subset of transform and scanning mode combinations, apply the selected transform to the residual data so as to generate a two-dimensional array of transform coefficients, and apply the selected scanning mode to the two-dimensional array of transform coefficients to generate a one-dimensional array of transform coefficients.

In another example of the disclosure, the video decoder 30 of the destination device 14 may be configured to receive encoded video data, wherein the encoded video data was encoded according to an intra-prediction mode, entropy decode the encoded video data, thereby creating a one-dimensional array of transform coefficients, determine a transform from a subset of transform and scanning mode combinations, wherein the subset is based on the intra-prediction mode, determine a scanning mode from the subset of transform and scanning mode combinations, scan the one-dimensional array of transform coefficients with the determined scanning mode to produce a two-dimensional array of transform coefficients, and inverse transform the two-dimensional array of transform coefficients with the determined transform to produce residual video data.

In another example of the disclosure, the video encoder 20 of the source device 12 may be configured to calculate residual data corresponding to a portion of the at least one frame, select a transform from a plurality of transforms, apply the selected transform to the residual data to transform the residual data so as to generate a two-dimensional array of transform coefficients, select a scanning mode from a plurality of scanning modes, wherein the selected scanning mode is mapped from the selected transform, and apply the selected scanning mode to the two-dimensional array of transform coefficients to generate a one-dimensional array of transform coefficients.

In another example of the disclosure, the video decoder 30 of the destination device 14 may be configured to entropy decode encoded video data corresponding to a portion of the at least one frame, thereby creating a one-dimensional array of transform coefficients, determine a transform from a plurality of transforms, select a scanning mode from a plurality of scanning modes, wherein the selected scanning mode is mapped from the determined transform, and apply the selected scanning mode to the one-dimensional array of transform coefficients to generate a two-dimensional array of transform coefficients. The video decoder 30 may further apply an inverse transform to the two-dimensional array of transform coefficients, where the inverse transform corresponds to the determined transform.

Figure 5:
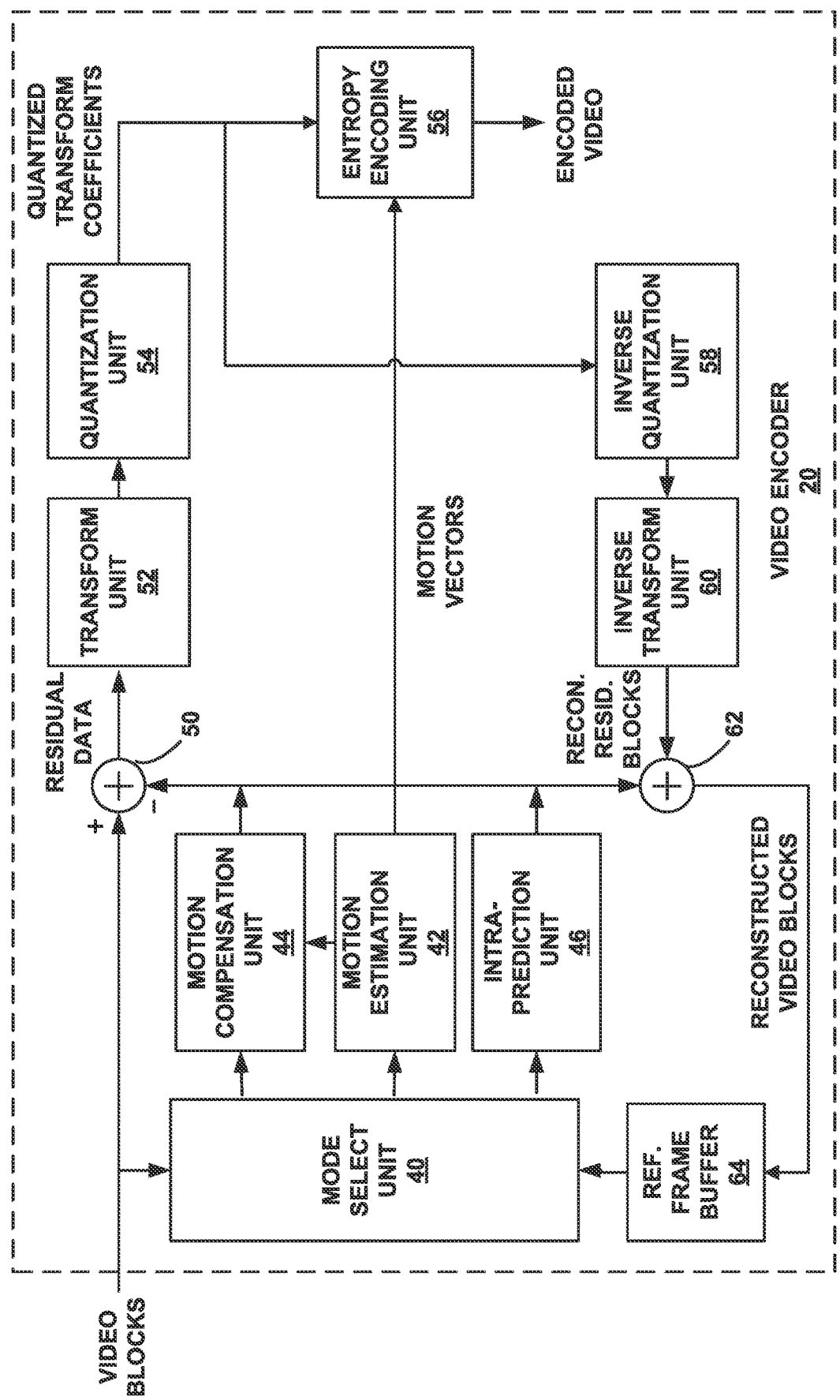
FIG. 5 is a block diagram illustrating an example video encoder.

FIG. 5 is a block diagram illustrating an example of a video encoder 20 that may use techniques for transforming residual data and scanning transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 4, the video encoder 20 includes a motion compensation unit 44, a motion estimation unit 42, an intra-prediction unit 46, a reference frame buffer 64, a summer 50, a transform unit 52, a quantization unit 54, and an entropy encoding unit 56. The transform unit 52 illustrated in FIG. 5 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 58, an inverse transform unit 60, and a summer 62. A deblocking filter (not shown in FIG. 5) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of square difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position. Motion compensation, performed by the motion compensation unit 44, may involve fetching or generating values for the prediction unit based on the motion vector determined by motion estimation. Again, the motion estimation unit 42 and the motion compensation unit 44 may be functionally integrated, in some examples.

The motion estimation unit 42 calculates a motion vector for a prediction unit of an inter-coded frame by comparing the prediction unit to reference samples of a reference frame stored in the reference frame buffer 64. For example, motion estimation unit 42 may calculate an aggregate value representative of pixel-by-pixel differences between the prediction unit and a reference sample being considered, e.g., using sum of absolute difference (SAD), sum of squared difference (SSD), mean absolute difference (MAD), mean squared difference (MSD), or the like. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision. The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-four directional prediction modes and one planar prediction mode, based on the size of the CU being encoded. FIG. 1 shows examples of intra-prediction modes.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The techniques for this disclosure are applicable for use in the transformation of residual data in either prediction mode (i.e., both inter- and intra-prediction). As such, in the context of this disclosure, a residual coding unit may refer to either a motion compensation unit or an intra-prediction unit. That is, the residual data received by transform unit 52 may be calculated relative to intra-predicted data or inter-predicted data for a corresponding block.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 selects a transform (which may comprise a separable transform including two transform components applied in orthogonal directions) from among a plurality of transforms. The transform may be selected based on one or more coding characteristics, such as block size, coding mode, or the like. According to one example of the disclosure, the transform is selected from a subset of transform and scanning mode combinations based on the intra-prediction mode. The subset of transform and scanning mode combinations is smaller than the total number of transform and scanning mode combinations that are possible for use by the video encoder.

The transform unit 52 then applies the selected transform to the TU, producing a video block comprising a two-dimensional array of transform coefficients. As discussed above, potential transforms that may be selected include a prediction-mode-dependent transform, a separable transform including a first designed transform component in the vertical direction combined with a DCT component in the horizontal direction, a separable transform including a DCT component in the vertical direction combined with a second designed transform component in the horizontal direction, a separable transform including a first designed transform component in the horizontal direction combined with a second designed transform component in the vertical direction, a separable transform including a third designed transform component in the horizontal direction combined with a fourth designed transform component in the vertical direction, or any other transform suitable for use in transforming residual data.

The transform unit 52, or another unit of the video encoder (such as entropy encoding unit 56), may signal the transform selected in the encoded video bitstream for use by a video decoder (e.g., the video decoder 30 in FIG. 3). In another example, the transform unit 52 may signal an indication of an inverse transform to be used by the video decoder based on the transform used by the transform unit 52. The indicated inverse transform would reverse the process performed by the transform unit 52. In this context, signaling the transform or inverse transform in the encoded bitstream does not require real-time transmission of such elements from the encoder to a decoder, but rather means that such syntax elements are encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

The transform unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

In one example of the disclosure, the entropy encoding unit 56 (of some other unit of the video encoder) selects a transform and scanning mode from a subset of transform and scanning mode combinations. The transform and scanning mode combination may be selected together through a testing process, wherein the combination that produces the lowest rate-distortion cost is chosen. In this example, an index indicating the selected combination may be signaled in the encoded video bitstream. The index may be entropy-coded using CABAC or CAVLC.

In another example, the scanning mode is selected based on the transform. That is, each transform is mapped to a specific scanning mode. Such a mapping may be stored at both the encoder and the decoder. As such, an index indicating the transform is signaled in the encoded video bitstream and the scanning mode is then inferred by the video decoder based on the mapping. The index of the transform may be entropy-coded using CABAC or CAVLC.

In another example, the scanning mode is selected based on the intra-prediction mode. That is, each transform and scanning mode combination in the subset has the same scanning mode, since the subset is also based on the intra-prediction mode. The relationship between intra-prediction modes and scanning modes may be stored at both the encoder and the decoder. As such, an index indicating the transform is signaled in the encoded video bitstream and the scanning mode is then inferred by the video decoder based on the intra-prediction mode.

In another example of the disclosure, the entropy encoding unit 56 selects the scanning mode based on the transform used to create the two-dimensional array of transform coefficients. In this example, the transforms and scanning modes are not restricted to a subset of combinations based on the intra-prediction mode. Rather, each transform is mapped to a specific scanning mode. In this case, the transform may be chosen from all possible transforms allowed for a video encoder or from a subset. The subset may be chosen based on intra prediction mode and/or block size. Accordingly, video encoder 20 may include a memory that stores a set of configuration data defining a mapping from each of a plurality of transforms to respective scanning modes. Examples of such mappings are shown in FIG. 3, as discussed above. Given this technique, the entropy encoding unit 56 need not test all possible scanning modes and make an evaluation as to which one provided the best performance. Instead, the selection is predicated on the transform used. Likewise, entropy encoding unit 56 need not signal the scan separately from the signal used to indicate the transform. The entropy encoding unit 56 then applies the selected scanning mode to the two-dimensional array of transform coefficients to generate a one-dimensional array of transform coefficients.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients. In addition, the entropy encoding unit 56 may encode motion vector (MV) information and any of a variety of syntax elements useful in decoding the video data at the video decoder 30.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 6:
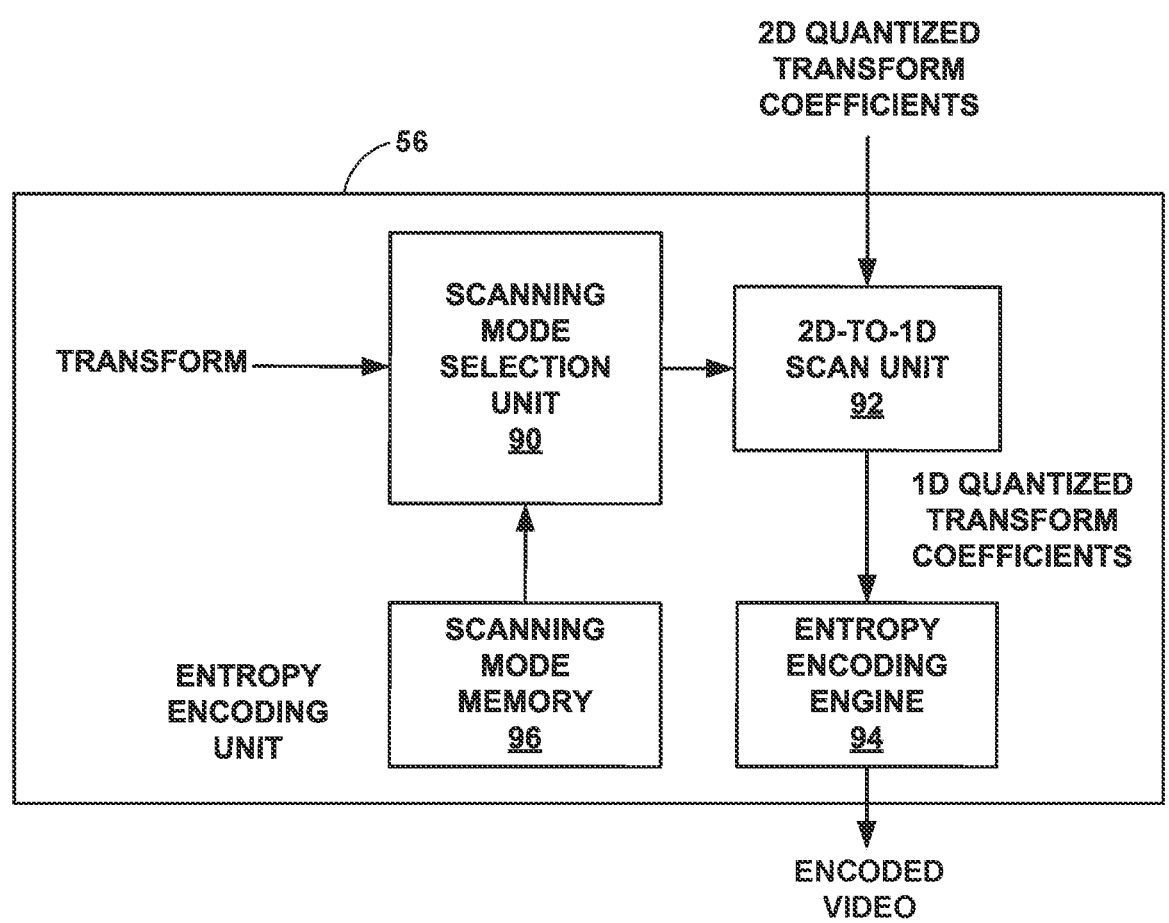
FIG. 6 is a block diagram illustrating an example entropy encoding unit.

FIG. 6 is a block diagram illustrating an example of an entropy encoding unit 56 for use in the video encoder of FIG. 5. FIG. 6 illustrates various functional aspects of the entropy encoding unit 56, including techniques for selecting a scanning mode according to this disclosure. The entropy encoding unit 56 may include a scanning mode selection unit 90, a 2D-to-1D scan unit 92, an entropy encoding engine 94, and a scanning mode memory 96.

The scanning mode selection unit 90 selects the scanning mode to be used by the 2D-to-1D scan unit 92 to scan a two-dimensional array of transform coefficients into a one-dimensional array of transform coefficients. The scanning mode selection unit 90 may select the scanning mode from among a plurality of scanning modes, including the diagonal, vertical, and horizontal scanning modes shown in FIG. 2. In one example of this disclosure, the scanning mode is selected from a subset of transform and scanning mode combinations based on the intra-prediction mode. Selection of the scanning mode from the subset may be based on the best (i.e., lowest rate-distortion cost) transform and scanning mode combination in the subset, may be transform-dependent, or may be intra-prediction mode dependent. In another example, this disclosure proposes that no transform and scanning mode subsets are used, and that the selection of the scanning mode is based on the transform used. In particular, each transform of a plurality of transforms is mapped to a specific scanning mode. The scanning mode memory 96 may store these mapped relationships (e.g., scanning mode to transform, scanning mode to intra-prediction mode) as configuration data so that the scanning mode selection unit 90 may retrieve them.

The 2D-to-1D scan unit 92 applies the selected scanning mode to the two-dimensional array of transform coefficients to generate a one-dimensional array of transform coefficients. The entropy encoding engine 94 then applies an entropy encoding process to the scanned coefficients. As discussed above, the entropy encoding engine 94 may use CABAC, CAVLC, or another entropy coding algorithm. The entropy encoding engine 94 produces a bitstream carrying the encoded video. The bitstream may be transmitted to another device or stored in a data storage archive for later retrieval. In addition to the residual transform coefficient data, the bitstream may carry motion vector data and various syntax elements useful in decoding the encoded video in the bitstream.

It should be noted that, although shown as separate functional units for ease of illustration, the structure and functionality of the scan order and context selection unit 90, the 2D-to-1D scan unit 92, the entropy encoding engine 94, and the scanning mode memory 96 may be highly integrated with one another.

Figure 7:
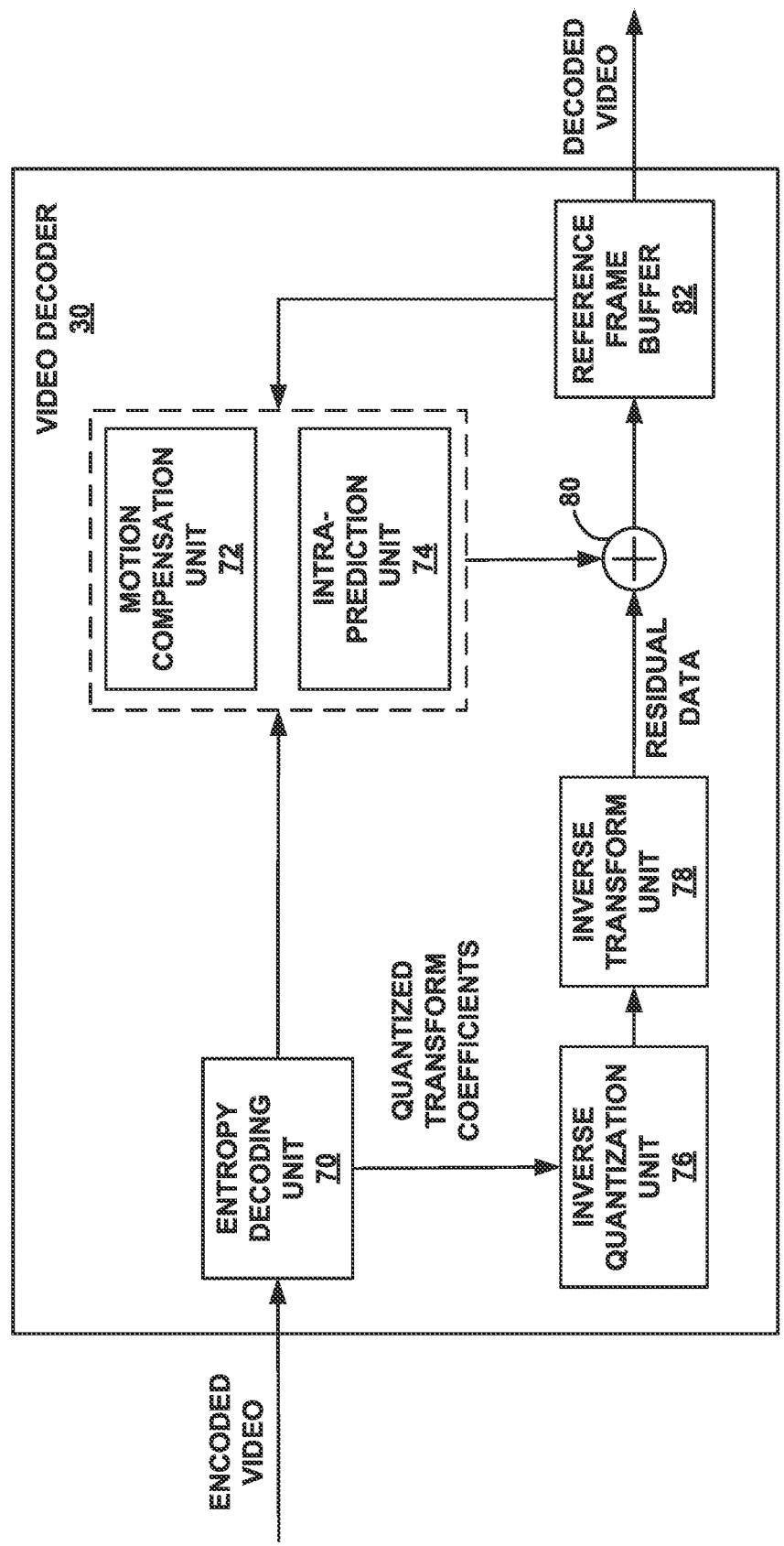
FIG. 7 is a block diagram illustrating an example video decoder.

FIG. 7 is a block diagram illustrating an example of a video decoder 30, which decodes an encoded video sequence. In the example of FIG. 6, the video decoder 30 includes an entropy decoding unit 70, a motion compensation unit 72, an intra-prediction unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 5).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

According to one example of this disclosure, the video decoder 30 may receive an index in the encoded video bitstream indicating a transform and scanning mode combination from a subset of transform and scanning mode combinations, where the subset is based on the intra-prediction mode. The index may be represented by a binary value having a length as small as two-bits in situations where there are four or fewer combinations in the subset. The index may have been entropy coded using CABAC or CAVLC. In other examples, the index may only indicate the transform used from the subset of transform and scanning mode combinations. In this example, the scanning mode may be either transform-dependent or intra-prediction mode and/or block size dependent. The video decoder may store configuration data that indicates how the scanning mode is mapped from or relates to the transform or intra-prediction mode.

According to other examples of this disclosure, the video decoder 30 may receive, from the encoded bitstream, signaling information that identifies the transform used by the video encoder 20 to create the two-dimensional array of transform coefficients. In this example, transform and scanning mode combinations are not limited to a subset based on the intra-prediction mode. In another example, the video decoder may receive, from the encoded bitstream, signaling information that indicates and inverse transform to be used to reverse the transform applied by an encoder. Since the transforms used by the encoder are mapped to specific scanning modes, the entropy decoding unit 70 may determine the scanning mode needed to reverse the scan from the signaled transform or inverse transform. As another example, the entropy decoding unit 70 may infer the transform or combination of transforms used by the encoder from one or more coding characteristics such as block size, coding mode, or the like. Once the scanning mode is determined, entropy decoding unit 70 applies the scanning mode to the one-dimensional array of transform coefficients to generate a two-dimensional array of transform coefficients. The two-dimensional array of transform coefficients produced by the entropy decoding unit 70 may still be in quantized form and may generally match the two-dimensional array of transform coefficients scanned by the entropy encoding unit 56 of the video encoder 20.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 58 applies an inverse transform, such as the inverse of the transforms described above for use with the transform unit 52 of the video encoder 20. In one example, the inverse transform may be inferred from an index indicating a transform and scanning mode combination used by the video encoder. The transform and scanning mode combination may be from a subset of transform and scanning mode combinations based on the intra-prediction mode and/or block size.

In other examples, the inverse transform unit 78 may determine an inverse transform based on signaling from the video encoder 20 of the transform alone, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms (e.g. a primary transform such as inverse 2-D discrete cosine transform and a secondary transform such as inverse rotational transform) to the transform coefficients of the current block being decoded.

The motion compensation unit 72 may generate prediction data based on motion vectors received from the entropy decoding unit 70. The intra-prediction unit 74 may generate prediction data for a current block of a current frame based on a signaled intra-prediction mode and data from previously decoded blocks of the current frame.

The motion compensation unit 72 produces motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

The motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 4).

As mentioned above, the techniques for transforming residual data and scanning transform coefficients presented in this disclosure are applicable for both an encoder and a decoder. A video encoder may apply the scanning mode to scan transform coefficients from the two-dimensional array to the one-dimensional array, whereas a video decoder may apply the scanning mode, e.g., in an inverse manner to the encoder, to scan transform coefficients from the one-dimensional array to the two-dimensional array. Alternatively, a video decoder may apply the scanning mode to scan transform coefficients from the one-dimensional array to the two-dimensional array, and a video encoder may apply the scanning mode, in an inverse manner to the decoder, to scan transform coefficients from the two-dimensional array to the one-dimensional array. Hence, scanning by a coder may refer to 2D-to-1D scanning by an encoder or 1D-to-2D scanning by a decoder. In addition, scanning according to a scanning mode may refer to scanning in the scanning mode for 2D-to-1D scanning, scanning in the scanning mode for 1D-to-2D scanning, scanning in the inverse of the scanning mode for 1D-to-2D scanning, or scanning in the inverse of the scanning mode for 2D-to-1D scanning. Hence, the scanning mode may be established for scanning by the encoder or scanning by the decoder.

Figure 8:
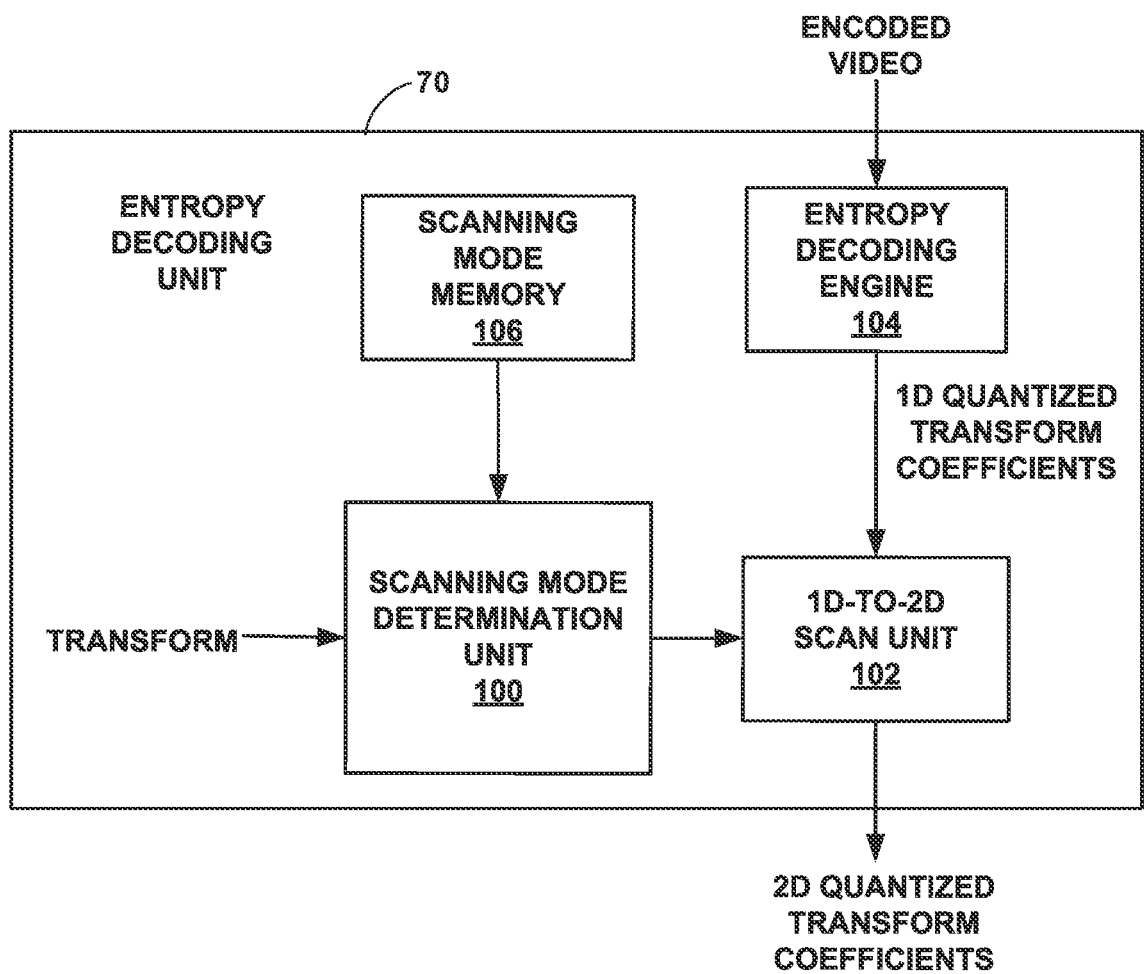
FIG. 8 is a block diagram illustrating an example entropy decoding unit.

FIG. 8 is a block diagram illustrating an example of an entropy decoding unit 70 for use in the video decoder of FIG. 7. FIG. 8 illustrates various functional aspects of the entropy decoding unit 70 for scanning transform coefficients according to this disclosure. As shown in FIG. 8, the entropy decoding unit 70 may include a scanning mode determination unit 100, a 1D-to-2D scan unit 102, an entropy decoding engine 104, and a scanning mode memory 106.

The entropy decoding engine 104 entropy decodes encoded video transmitted to the video decoder 30 or retrieved by the video decoder 30 from a storage device. For example, the entropy decoding engine 104 may apply an entropy decoding process, e.g., CAVLC, CABAC or another process, to the bitstream carrying the encoded video to recover the one-dimensional array of transform coefficients. In addition to the residual transform coefficient data, the entropy decoding engine 104 may apply entropy decoding to reproduce motion vector data and various syntax elements useful in decoding the encoded video in the bitstream. The entropy decoding engine 104 may determine which entropy decoding process, e.g., CAVLC, CABAC or another process, to select based on signaling in the encoded video bitstream or by inferring the appropriate process from other information in the bitstream.

The 1D-to-2D scan unit 102 applies a scanning mode to the one-dimensional array of transform coefficients to produce a two-dimensional array of transform coefficients. If the encoder quantized the transform coefficients, the two-dimensional array of transform coefficients generated by the 1D-to-2D scan unit 102 will also be quantized. The scanning mode applied is the inverse of the scanning mode used by the video encoder. The scanning mode determination unit 100 determines this scanning mode.

In one example, the scanning mode determination unit 100 may determine the scanning mode by receiving an index which indicates the transform and scanning mode combination used by a video encoder. The transform and scanning mode combination is from a subset of transform and scanning mode combinations based on the intra-prediction mode and/or block size. The index may be as small as a 2-bit index in situations where there are four or fewer combinations in the subset. The index may be entropy coded using CABAC or CAVLC. In other examples, the index may only indicate the transform used from the subset of transform and scanning mode combinations. In this example, the scanning mode may be either transform-dependent or intra-prediction mode and/or block size dependent. The video decoder may store configuration data in the scanning mode memory 106 that indicates how the scanning mode is mapped from or relates to the transform or intra-prediction mode.

In another example, the scanning mode determination unit 100 may determine the scanning mode by retrieving a signaling of the transform used by the video encoder. In this example, the transform and/or scanning mode are not restricted to a subset of transform and scanning mode combinations based on the intra-prediction mode. In another example, the scanning mode determination unit 100 may infer the transform used by the video encoder from a signaling of an inverse transform to be used by the video decoder. Since transforms are mapped to specific scanning modes, the scanning mode determination unit may determine the scanning mode by consulting a mapping that shows the associations between the determined transform and a scanning mode. Such a mapping may be stored in scanning mode memory 106. In another example, the scanning mode determination unit 100 may infer the transform used by the encoder from one or more coding characteristics such as block size, coding mode, or the like.

Figure 9:
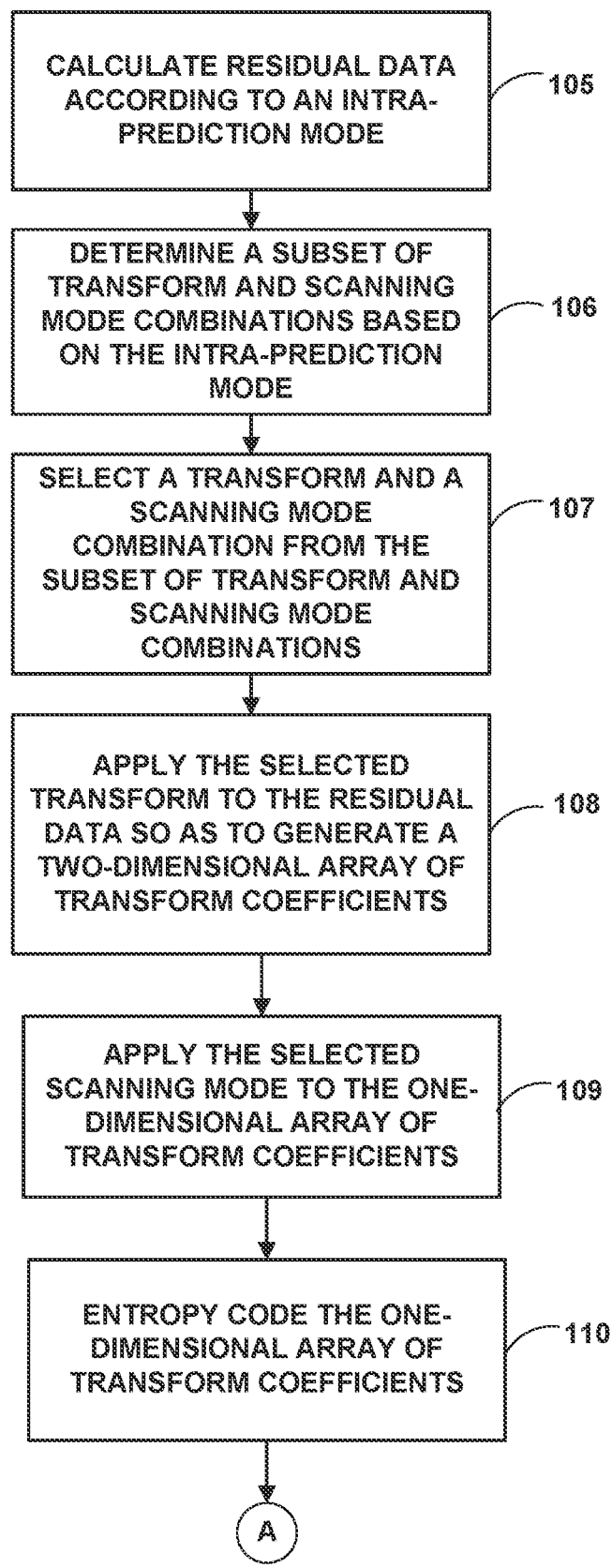
FIG. 9 is a flowchart illustrating an example method of encoding video.

FIG. 9 is a flowchart illustrating an example method of encoding video. Initially, a video encoder calculates residual data according to an intra-prediction mode (105). Based on the intra-prediction mode and/or block size, the video encoder determines a subset of transform and scanning mode combinations (106). In one example, the subset of transform and scanning mode combinations is smaller than the total number of transform and scanning modes that are possible. For example, the HEVC standard currently allows 12 transform and scanning mode combinations. The subset of combinations for each intra-prediction mode may be set at some smaller number (e.g., four combinations).

Next, the video encoder selects a transform and a scanning mode combination from the subset of transform and scanning mode combinations (107). The video encoder applies the selected transform to the residual data so as to generate a two-dimensional array of transform coefficients (108) and applies the selected scanning mode to the two-dimensional array of transform coefficients to generate a one-dimensional array of transform coefficients (109). The video encoder may then entropy code the one-dimensional array of transform coefficients to produce an encoded video bitstream (110).

Figure 10A:
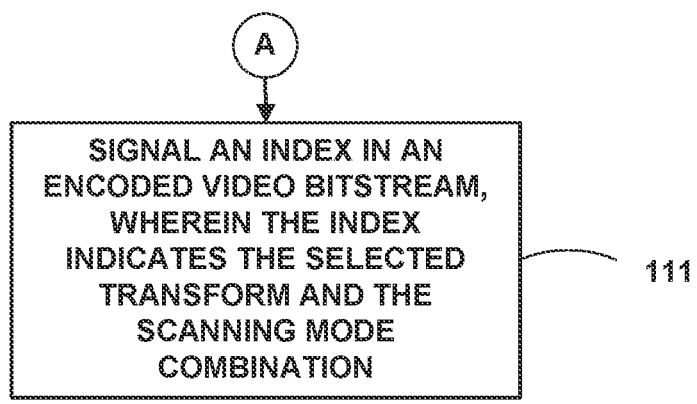
FIGS. 10A and 10B are flowcharts illustrating other example methods of encoding video.
Figure 10B:
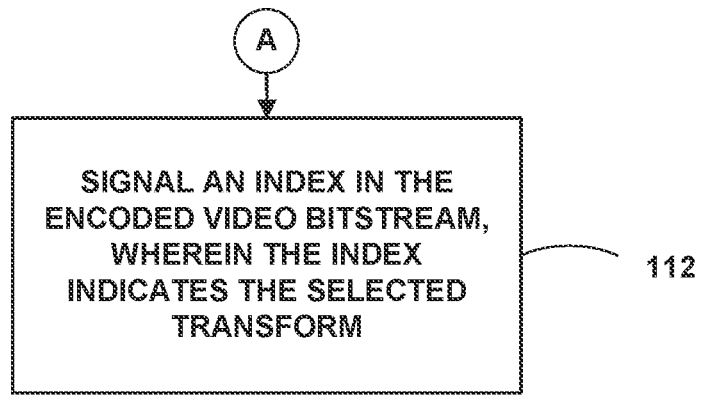

FIGS. 10A and 10B are flowcharts illustrating additional method steps of encoding video. In addition to entropy coding, the video encoder may also signal an index in an encoded video bitstream, wherein the index indicates the selected transform and scanning mode combination (111). If the number of transform and scanning mode combinations is limited to four or fewer, the index may be as few as 2-bits. The index may be entropy-coded using CABAC or CAVLC.

In another example, the video encoder may signal an index in the encoded video bitstream, wherein the index indicates the selected transform (112). In this case, the scanning mode is determined through a predetermined relationship between the scanning mode and either the transform or the intra-prediction mode. In one example, each transform in the subset is mapped to a specific scanning mode. In another example, each of the scanning modes in the subset of transform and scanning mode combinations is based on the intra-prediction mode.

Figure 11:
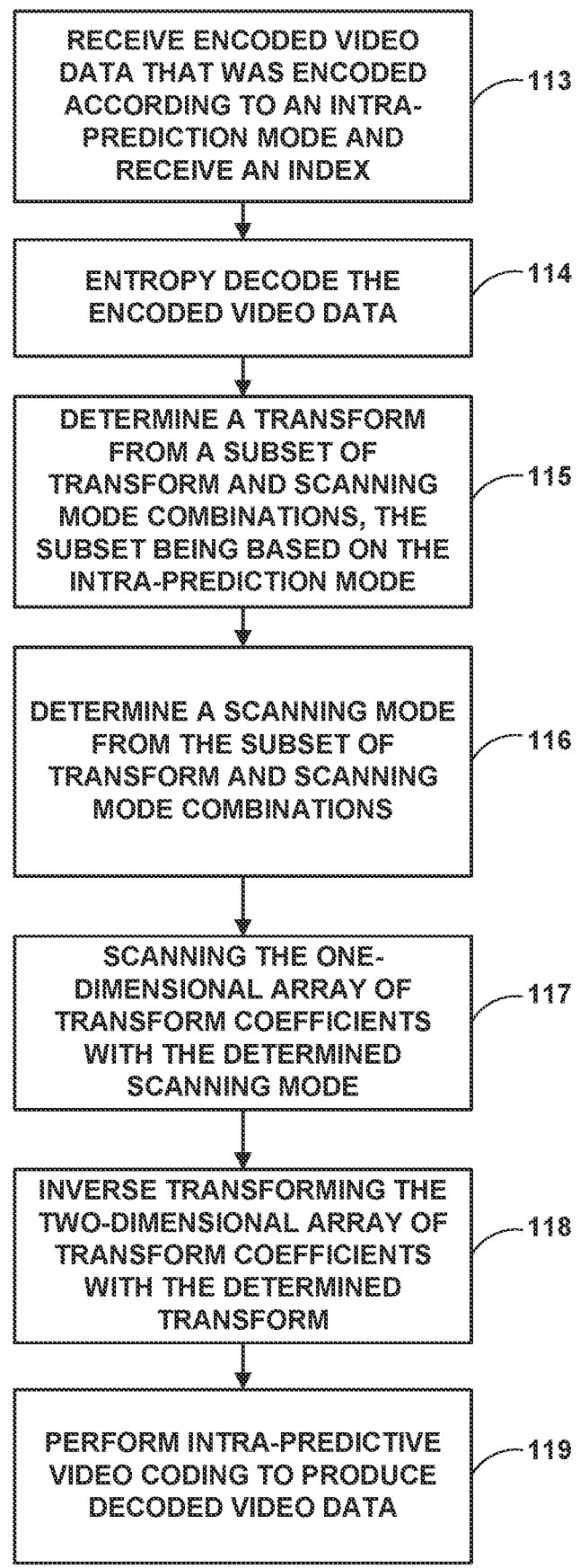
FIG. 11 is a flowchart illustrating an example method of decoding video.

FIG. 11 is a flowchart illustrating an example method of decoding video. A video encoder receives encoded video data, wherein the encoded video data was encoded according to an intra-prediction mode (113). The video decoder may also receive an index. In one example, the index indicates both the transform and the scanning mode used by an encoder to encode the video data. In another example, the index may only indicate the transform used by the encoder. In this case, the scanning mode may be either transform-dependent or intra-prediction mode dependent. That is, the decoder may store configuration data that indicates the relationship between a transform and the scanning mode or between a scanning mode and intra-prediction mode.

Next, the video decoder entropy decodes the encoded video data, thereby creating a one-dimensional array of transform coefficients (114). The video decoder determines a transform from a subset of transform and scanning mode combinations, wherein the subset is based on the intra-prediction mode (115). As mentioned above, the transform may be determined from an index sent in the encoded video bitstream. The video decoder also determines a scanning mode from the subset of transform and scanning mode combinations (116). As mentioned above, the scanning mode may be determined from the index, the determined transform, or from the intra-prediction mode. The video decoder may then scan the one-dimensional array of transform coefficients with the determined scanning mode to produce a two-dimensional array of transform coefficients (117), and inverse transform the two-dimensional array of transform coefficients with the determined transform to produce residual video data (118). The video decoder may then perform an intra-predictive video coding process on the residual video data according to the intra-prediction mode to produce decoded video data (119).

Figure 12:
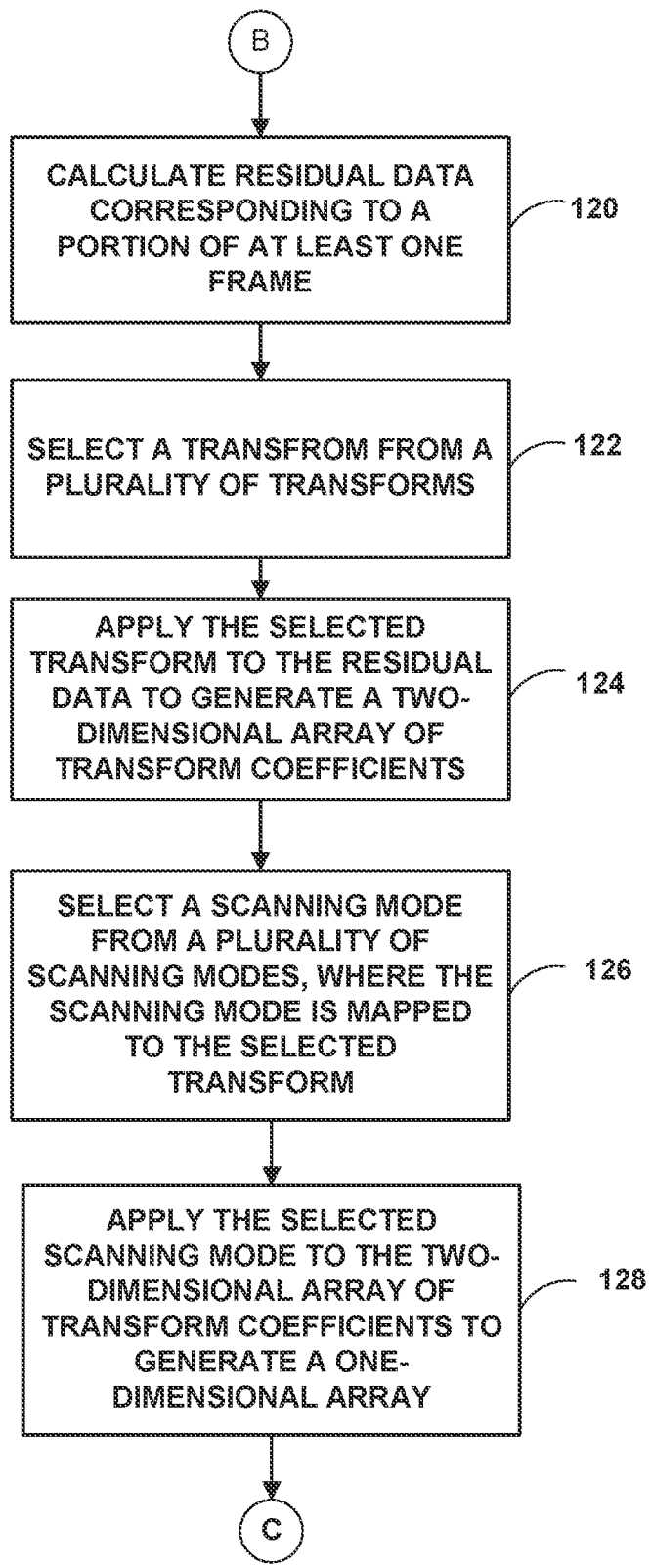
FIG. 12 is a flowchart illustrating an example method of encoding video.

FIG. 12 is a flowchart illustrating an example method of encoding video. The method of FIG. 12 includes steps for coding video data comprising at least one frame. First, a video encoder, such as video encoder 20 (FIGS. 4 and 5), calculates residual data corresponding to a portion of the at least one frame (120). The video encoder selects a transform from a plurality of transforms (122). Transforms may be selected based on one or more coding characteristics such as block size, coding mode, or the like. The video encoder applies the selected transform to the residual data to transform the residual data so as to generate a two-dimensional array of transform coefficients (124). The video encoder selects a scanning mode from a plurality of scanning modes, wherein the selected scanning mode is mapped from the selected one or more transforms (126). As discussed above, by mapping transforms to specific scanning modes, the techniques of this disclosure avoid having to execute and evaluate multiple scanning modes. That is, applying the selected scanning mode to the two-dimensional array comprises applying only the selected scanning mode to the two-dimensional array without applying any other ones of the plurality of scanning modes to the two-dimensional array to generate the one-dimensional array of transform coefficients. Next, the video encoder applies the selected scanning mode to the two-dimensional array of transform coefficients to generate a one-dimensional array of transform coefficients (128).

The following are examples of mappings between transforms and scanning modes. In one example, the selected transform is a discrete cosine transform in the horizontal direction and discrete cosine transform in the vertical direction and is mapped to a diagonal scanning mode.

In another example, the selected transform is a separable transform including a designed transform component applied in a horizontal direction across the residual data and a discrete cosine transform (DCT) component applied in a vertical direction across the residual data. The horizontal designed transform and the vertical DCT are mapped to a vertical scanning mode. The designed transform comprises a designed transform that is trained from a set of blocks from training sequences that would likely use such a transform in the horizontal direction.

In another example, the selected transform is a separable transform including a discrete cosine transform (DCT) component applied in a horizontal direction across the residual data and a designed transform component applied in a vertical direction across the residual data. The horizontal DCT and the vertical designed transform are mapped to a horizontal scanning mode. The designed transform comprises a designed transform that is trained from a set of blocks from training sequences that would likely use such a transform in the vertical direction.

In another example, the selected transform is a separable transform including a first designed transform component applied in a horizontal direction across the residual data and a second designed transform component applied in a vertical direction across the residual data. The horizontal first designed transform and the vertical second designed transform are mapped to a horizontal scanning mode. Each of the first and second designed transforms comprises a designed transform that is trained from a set of blocks from training sequences that would likely use such a transform in the respective direction with horizontal scanning mode.

In another example, the selected transform is a separable transform including a third designed transform component applied in a horizontal direction across the residual data and a fourth designed transform component applied in a vertical direction across the residual data. The horizontal third designed transform and the vertical fourth designed transform are mapped to a vertical scanning mode. Each of the third and fourth designed transforms comprises a designed transform that is trained from a set of blocks from training sequences that would likely use such a transform in the respective direction with vertical scanning mode.

Figure 13A:
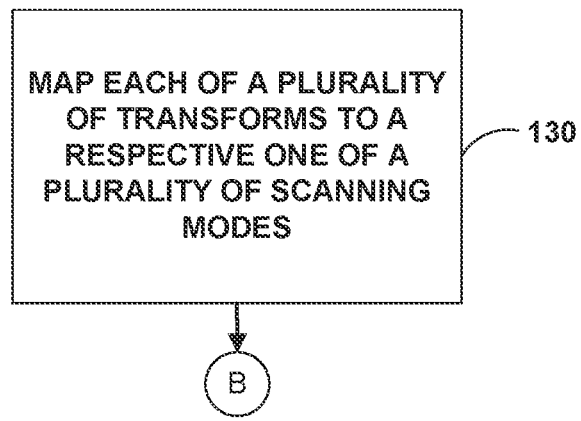
FIGS. 13A, 13B, and 13C are flowcharts illustrating other example methods of encoding video.
Figure 13B:
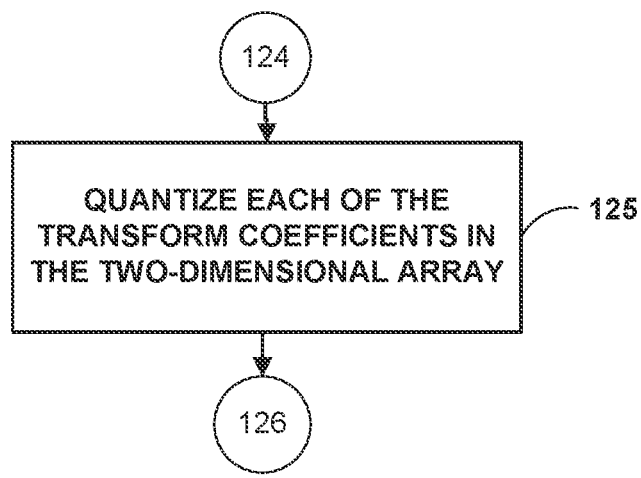
Figure 13C:
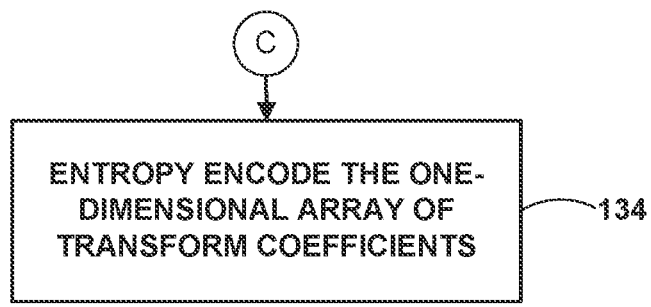

FIGS. 13A, 13B, and 13C are flowcharts illustrating other example methods of encoding video. Prior to step 120, a video encoder, such as video encoder 20, may map each of a plurality of transforms to a respective one of a plurality of scanning modes (130). While this step may be performed actively by the encoder, it is also contemplated that the mapping may occur prior to construction of the encoder and that the mappings may be stored or programmed into the video encoder hardware. Similarly, similar mappings may be stored to a video decoder, such as video decoder 30 (FIGS. 4 and 7).

In another example, between steps 124 and 126, the video encoder quantizes each of the transform coefficients in the two-dimensional array (125). Additionally, after step 128, the video encoder may entropy encode the one-dimensional array of transform coefficients (134).

Figure 14:
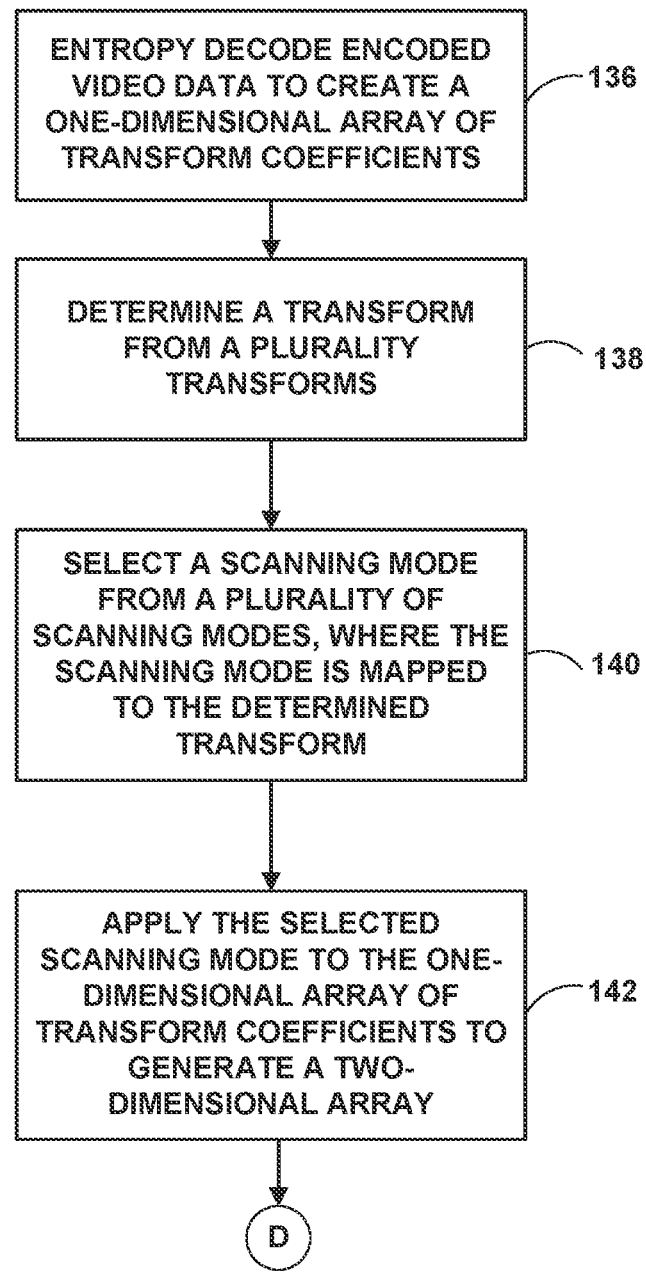
FIG. 14 is a flowchart illustrating an example method of decoding video.

FIG. 14 is a flowchart illustrating an example method of decoding video. FIG. 10 shows an example method of decoding video data comprising at least one frame. First, a video decoder, such as video decoder 30, entropy decodes encoded video data corresponding to a portion of the at least one frame, thereby creating a one-dimensional array of transform coefficients (136). The video decoder determines a transform from a plurality of transforms (138). The transform may be determined through explicit signaling in the encoded video bitstream or may be inferred from one or more coding characteristics such as block size, coding mode, or the like. The video decoder selects a scanning mode from a plurality of scanning modes, wherein the selected scanning mode is mapped from the determined transform (140). The video decoder applies the selected scanning mode to the one-dimensional array of transform coefficients to generate a two-dimensional array of transform coefficients (142).

Figure 15:
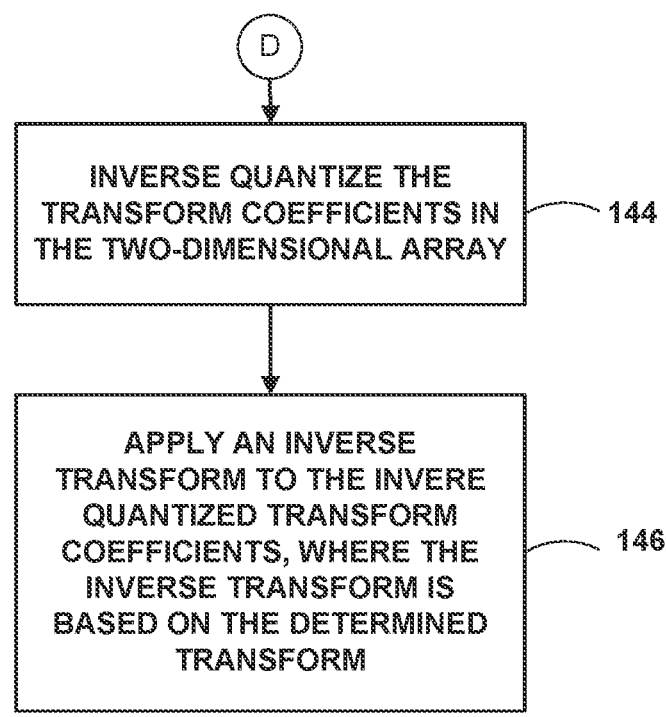
FIG. 15 is a flowchart illustrating another example method of decoding video.

FIG. 15 is a flowchart illustrating another example method of decoding video. Following step 142, the video decoder inverse quantizes the transform coefficients defined in the two-dimensional array of transform coefficients (144). Next, the video decoder applies an inverse transform to the inverse quantized transform coefficients, wherein the inverse transform is based on the determined transform (146).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving encoded video data encoded according to an intra-prediction mode, wherein the intra-prediction mode is one of a plurality of intra-prediction modes, the plurality of intra- prediction modes including a DC mode, a planar mode, and a plurality of directional prediction modes;
entropy decoding the encoded video data to create an array of transform coefficients;
determining a transform based on the intra-prediction mode and a block size of the transform;
determining, based on a mapping with the determined transform, a scanning mode, wherein the scanning mode has a predefined scanning order; and
applying the determined scanning mode to the array of transform coefficients to produce a block of transform coefficients.

2. The method of claim 1, wherein the transform includes a horizontal discrete cosine transform (DCT) and a vertical DCT, and wherein the scanning mode is a diagonal scan.

3. The method of claim 1, wherein the transform includes a horizontal discrete sine transform (DST) and a vertical discrete cosine transform (DCT), and wherein the scanning mode is a vertical scan.

4. The method of claim 1, wherein the transform includes a vertical discrete sine transform (DST) and a horizontal discrete cosine transform (DCT), and wherein the scanning mode is a horizontal scan.

5. The method of claim 1, further comprising:
inverse quantizing the block of transform coefficients to produce a block of inverse quantized transform coefficients;
applying an inverse transform, based on the transform, to the block of inverse quantized transform coefficients to produce a residual block; and
decoding the residual block to produce a decoded block.

6. The method of claim 5, further comprising:
displaying a picture that includes the decoded block.

7. An apparatus configured to decode video data, the apparatus comprising:
a memory configured to store encoded video data; and
one or more processors implemented in circuitry and in communication with the memory, the one or more processors configured to:
receive the encoded video data encoded according to an intra-prediction mode, wherein the intra-prediction mode is one of a plurality of intra-prediction modes, the plurality of intra-prediction modes including a DC mode, a planar mode, and a plurality of directional prediction modes;
entropy decode the encoded video data to create an array of transform coefficients;
determine a transform based on the intra-prediction mode and a block size of the transform;
determine, based on a mapping with the determined transform, a scanning mode, wherein the scanning mode has a predefined scanning order; and
apply the determined scanning mode to the array of transform coefficients to produce a block of transform coefficients.

8. The apparatus of claim 7, wherein the transform includes a horizontal discrete cosine transform (DCT) and a vertical DCT, and wherein the scanning mode is a diagonal scan.

9. The apparatus of claim 7, wherein the transform includes a horizontal discrete sine transform (DST) and a vertical discrete cosine transform (DCT), and wherein the scanning mode is a vertical scan.

10. The apparatus of claim 7, wherein the transform includes a vertical discrete sine transform (DST) and a horizontal discrete cosine transform (DCT), and wherein the scanning mode is a horizontal scan.

11. The apparatus of claim 7, wherein the one or more processors are further configured to:
inverse quantize the block of transform coefficients to produce a block of inverse quantized transform coefficients;
apply an inverse transform, based on the transform, to the block of inverse quantized transform coefficients to produce a residual block; and
decode the residual block to produce a decoded block.

12. The apparatus of claim 11, further comprising:
a display configured to display a picture that includes the decoded block.

13. A method of encoding video data, the method comprising:
receiving video data;
encoding a block of the video data according to an intra-prediction mode to create a residual block, wherein the intra-prediction mode is one of a plurality of intra-prediction modes, the plurality of intra-prediction modes including a DC mode, a planar mode, and a plurality of directional prediction modes;
determining a transform based on the intra-prediction mode and a block size of the transform;
transforming the residual block using the transform to create a block of transform coefficients;
determining, based on a mapping with the determined transform, a scanning mode, wherein the scanning mode has a predefined scanning order;
applying the determined scanning mode to the block of transform coefficients to produce an array of transform coefficients; and
entropy encoding the array of transform coefficients.

14. The method of claim 13, wherein the transform includes a horizontal discrete cosine transform (DCT) and a vertical DCT, and wherein the scanning mode is a diagonal scan.

15. The method of claim 13, wherein the transform includes a horizontal discrete sine transform (DST) and a vertical discrete cosine transform (DCT), and wherein the scanning mode is a vertical scan.

16. The method of claim 13, wherein the transform includes a vertical discrete sine transform (DST) and a horizontal discrete cosine transform (DCT), and wherein the scanning mode is a horizontal scan.

17. The method of claim 13, further comprising: capturing a picture that includes the video data.

18. An apparatus configured to encode video data, the apparatus comprising:
- a memory configured to store video data; and
- one or more processors implemented in circuitry and in communication with the memory, the one or more processors configured to:
  - receive the video data;
  - encode a block of the video data according to an intra-prediction mode to create a residual block, wherein the intra-prediction mode is one of a plurality of intra-prediction modes, the plurality of intra-prediction modes including a DC mode, a planar mode, and a plurality of directional prediction modes;
  - determine a transform based on the intra-prediction mode and a block size of the transform;
  - transform the residual block using the transform to create a block of transform coefficients;
  - determine, based on a mapping with the determined transform, a scanning mode, wherein the scanning mode has a predefined scanning order;
  - apply the determined scanning mode to the block of transform coefficients to produce an array of transform coefficients; and
  - entropy encode the array of transform coefficients.

19. The apparatus of claim 18, wherein the transform includes a horizontal discrete cosine transform (DCT) and a vertical DCT, and wherein the scanning mode is a diagonal scan.

20. The apparatus of claim 18, wherein the transform includes a horizontal discrete sine transform (DST) and a vertical discrete cosine transform (DCT), and wherein the scanning mode is a vertical scan.

21. The apparatus of claim 18, wherein the transform includes a vertical discrete sine transform (DST) and a horizontal discrete cosine transform (DCT), and wherein the scanning mode is a horizontal scan.

22. The apparatus of claim 18, further comprising:
a camera configured to capture a picture that includes the video data.

* * * * *